(12) United States Patent
Synstelien et al.

(10) Patent No.: US 12,445,317 B2
(45) Date of Patent: *Oct. 14, 2025

(54) BIDIRECTIONAL POWER FEED DIGITAL COMMUNICATION DEVICE

(71) Applicant: ReadyLinks Inc., Chanhassen, MN (US)

(72) Inventors: Justin L. Synstelien, Chanhassen, MN (US); Brady M. Synstelien, Chanhassen, MN (US); Alec R. Synstelien, Chanhassen, MN (US); Garrett D. Synstelien, Chanhassen, MN (US); Larry D. Synstelien, Chanhassen, MN (US)

(73) Assignee: ReadyLinks Inc., Chanhassen, MN (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/354,113

(22) Filed: Jul. 18, 2023

(65) Prior Publication Data

US 2024/0129144 A1 Apr. 18, 2024

Related U.S. Application Data

(63) Continuation of application No. 17/804,162, filed on May 26, 2022, now Pat. No. 11,750,407.

(Continued)

(51) Int. Cl.
*H04L 12/10* (2006.01)

(52) U.S. Cl.
CPC .................. *H04L 12/10* (2013.01)

(58) Field of Classification Search
CPC ......... H04L 12/10; H04L 25/00; H04L 25/02; H04L 25/026; H04L 12/00; H04L 12/02;

(Continued)

(56) References Cited

U.S. PATENT DOCUMENTS 1,342,472 A * 6/1920 Synstelien ............... B60P 1/12
  298/17 B
5,959,507 A * 9/1999 Gresko .................. H04N 7/104
  333/132

(Continued)

FOREIGN PATENT DOCUMENTS

CA      2999566 A1    9/2018
CN      102713881 A   10/2012

(Continued)

OTHER PUBLICATIONS

"International Application Serial No. PCT US2022 073552, International Preliminary Report on Patentability mailed Jan. 18, 2024", 8 pgs.

(Continued)

*Primary Examiner* — James M Perez
(74) *Attorney, Agent, or Firm* — Schwegman Lundberg & Woessner, P.A.

(57) ABSTRACT

A digital communications port for communications with an external device over multiple conductors, the digital communications port including communication electronics for communicating radio frequency modulation (RF) communications over the multiple conductors. The digital communications port further includes bidirectional power feed electronics that are programmable to be configured to at least receive power from the external device using at least two of the multiple conductors so as to power the bidirectional power feed electronics and to power the communications electronics, or provide power to the external device using at least two of the multiple conductors so as to power the external device.

29 Claims, 21 Drawing Sheets

Related U.S. Application Data

(60) Provisional application No. 63/203,141, filed on Jul. 9, 2021.

(58) Field of Classification Search
CPC . H04B 3/54; H04B 3/548; H04B 3/56; H04B 2203/54; H04B 2203/5404; H04B 2203/5408; H04B 2203/5429; H04B 2203/545; H04B 2203/5462; H04B 2203/547; H04B 2203/5483; H04B 2203/5487; H04B 2203/5491

See application file for complete search history.

(56) References Cited

U.S. PATENT DOCUMENTS

| | | | |
|---|---|---|---|
| 6,052,380 A * | 4/2000 | Bell | H04L 12/413 |
| | | | 370/445 |
| 6,275,990 B1 * | 8/2001 | Dapper | H04L 27/2601 |
| | | | 375/E7.002 |
| 6,499,017 B1 | 12/2002 | Feibelman et al. | |
| 6,658,098 B2 * | 12/2003 | Lamb | H04L 12/10 |
| | | | 379/93.36 |
| 6,668,058 B2 * | 12/2003 | Grimes | H04B 3/54 |
| | | | 379/333 |
| 6,704,030 B1 | 3/2004 | Mcdonald et al. | |
| 6,771,744 B1 | 8/2004 | Smith et al. | |
| 7,194,756 B2 | 3/2007 | Addington et al. | |
| 7,397,911 B2 | 7/2008 | Shen et al. | |
| RE40,492 E * | 9/2008 | Grimes | H04B 3/54 |
| | | | 379/333 |
| 7,428,503 B1 | 9/2008 | Groff et al. | |
| 7,627,679 B1 | 12/2009 | Bowen et al. | |
| 7,783,270 B1 * | 8/2010 | Haab | H04L 12/10 |
| | | | 455/343.1 |
| 7,793,137 B2 * | 9/2010 | Karam | H04L 1/22 |
| | | | 714/4.12 |
| 7,812,766 B2 * | 10/2010 | Leblanc | G01S 1/026 |
| | | | 701/408 |
| 7,860,228 B1 | 12/2010 | Bailey et al. | |
| 7,979,518 B2 * | 7/2011 | Barnhouse | H04Q 3/0029 |
| | | | 379/15.02 |
| 8,046,809 B2 | 10/2011 | Setty et al. | |
| 8,156,246 B2 * | 4/2012 | Short | H04L 67/02 |
| | | | 709/239 |
| 8,484,690 B2 | 7/2013 | Ryals et al. | |
| 8,527,783 B2 * | 9/2013 | Lee | H04L 12/10 |
| | | | 713/300 |
| 8,549,331 B2 * | 10/2013 | Karam | H04L 1/22 |
| | | | 713/340 |
| 8,600,382 B2 | 12/2013 | Hicks | |
| 8,818,449 B2 | 8/2014 | Buckley et al. | |
| 8,897,178 B2 * | 11/2014 | Devuyst | H04L 5/1407 |
| | | | 370/230.1 |
| 8,948,018 B2 | 2/2015 | Afzal et al. | |
| 8,953,620 B2 | 2/2015 | Caldwell et al. | |
| 8,996,659 B2 | 3/2015 | Werth et al. | |
| 9,013,996 B2 | 4/2015 | Cook | |
| 9,087,319 B2 * | 7/2015 | Nguyen | H04L 12/185 |
| 9,191,711 B2 | 11/2015 | Hicks et al. | |
| 9,288,032 B2 | 3/2016 | Wei et al. | |
| 9,325,522 B2 | 4/2016 | Afkhami et al. | |
| 9,369,206 B2 * | 6/2016 | Boyd | H04Q 11/0067 |
| 9,380,646 B2 * | 6/2016 | Cui | H04W 76/16 |
| 9,531,599 B2 | 12/2016 | Prasad et al. | |
| 9,538,230 B2 | 1/2017 | He et al. | |
| 9,577,877 B2 | 2/2017 | Craine et al. | |
| 9,596,031 B2 * | 3/2017 | Soto | H04B 10/07955 |
| 9,648,492 B2 | 5/2017 | Mallikarjunan et al. | |
| 9,703,650 B1 * | 7/2017 | Byers | G06F 1/30 |
| 9,729,296 B2 | 8/2017 | Gomez Martinez | |
| 9,736,018 B2 | 8/2017 | Smith | |
| 9,736,078 B2 | 8/2017 | Tung et al. | |
| 9,960,810 B1 * | 5/2018 | He | H04B 3/548 |
| 10,003,382 B1 * | 6/2018 | Shi | H04B 3/54 |
| 10,079,672 B2 | 9/2018 | Arregui De La Cruz et al. | |
| 10,135,626 B2 * | 11/2018 | Pischl | H04L 12/10 |
| 10,153,807 B1 * | 12/2018 | Shi | H04L 27/0002 |
| 10,355,989 B1 * | 7/2019 | Panchal | H04L 67/10 |
| 10,419,130 B2 * | 9/2019 | Soto | H04B 10/806 |
| 10,439,924 B2 | 10/2019 | Ince et al. | |
| 10,454,226 B2 | 10/2019 | Lewis | |
| 10,476,684 B2 * | 11/2019 | Hartnett | H04L 12/10 |
| 10,541,829 B2 | 1/2020 | Colonques et al. | |
| 10,543,554 B2 * | 1/2020 | Trinnes | B23K 9/1043 |
| 10,592,930 B2 | 3/2020 | Ramer et al. | |
| 10,644,797 B2 | 5/2020 | Williams | |
| 10,763,917 B1 | 9/2020 | Jimenez De Parga Bernal | |
| 10,770,181 B2 | 9/2020 | Bull et al. | |
| 10,779,177 B2 | 9/2020 | Raleigh | |
| 10,783,581 B2 | 9/2020 | Raleigh | |
| 10,819,606 B2 | 10/2020 | Shaw et al. | |
| 10,833,949 B2 | 11/2020 | Liguori et al. | |
| 10,848,250 B2 * | 11/2020 | Soto | H04M 19/08 |
| 10,855,532 B2 | 12/2020 | Bhatt et al. | |
| 10,862,534 B2 | 12/2020 | Jeremy et al. | |
| 10,868,724 B2 | 12/2020 | Rzezak et al. | |
| 10,904,108 B2 * | 1/2021 | Schwengler | H04L 12/6418 |
| 10,931,474 B2 | 2/2021 | Barnett, Jr. | |
| 10,999,219 B1 | 5/2021 | Athreyapurapu et al. | |
| 11,132,683 B2 | 9/2021 | Kumnick et al. | |
| 11,153,267 B2 | 10/2021 | Gray | |
| 11,201,753 B1 * | 12/2021 | Barzegar | H04L 12/10 |
| 11,218,424 B1 | 1/2022 | Hanahan et al. | |
| 11,228,500 B2 | 1/2022 | Prabhu et al. | |
| 11,237,714 B2 | 2/2022 | Sundermeyer et al. | |
| 11,245,477 B2 * | 2/2022 | Soto | H04B 10/806 |
| 11,245,765 B2 | 2/2022 | Binder et al. | |
| 11,271,807 B2 | 3/2022 | Rothschild et al. | |
| 11,316,688 B2 | 4/2022 | Ansari et al. | |
| 11,323,325 B1 | 5/2022 | Hullahalli et al. | |
| 11,361,301 B2 | 6/2022 | Mcfarlin | |
| 11,394,122 B2 | 7/2022 | Wolniansky et al. | |
| 11,528,192 B2 | 12/2022 | Arora et al. | |
| 11,558,264 B1 * | 1/2023 | Synstelien | H04L 41/0806 |
| 11,627,011 B1 | 4/2023 | Callender et al. | |
| 11,641,391 B2 | 5/2023 | Kitchen et al. | |
| 11,647,112 B2 | 5/2023 | Lemley et al. | |
| 11,659,061 B2 | 5/2023 | Sawant et al. | |
| 11,736,841 B2 | 8/2023 | Jayawardene et al. | |
| 11,750,407 B2 * | 9/2023 | Synstelien | H04L 12/10 |
| | | | 375/257 |
| 11,929,887 B2 * | 3/2024 | Synstelien | H04L 12/2801 |
| 12,184,512 B2 * | 12/2024 | Synstelien | H04L 41/0886 |
| 2001/0046288 A1 * | 11/2001 | Grimes | H04B 3/54 |
| | | | 379/322 |
| 2004/0015405 A1 * | 1/2004 | Cloutier | H04N 21/2543 |
| | | | 705/26.1 |
| 2004/0172658 A1 * | 9/2004 | Rakib | G08B 13/19667 |
| | | | 725/111 |
| 2006/0022815 A1 * | 2/2006 | Fischer | G06K 7/10356 |
| | | | 340/505 |
| 2006/0077888 A1 * | 4/2006 | Karam | H04L 12/10 |
| | | | 370/216 |
| 2006/0078093 A1 * | 4/2006 | Karam | H04L 41/0604 |
| | | | 379/24 |
| 2006/0080573 A1 * | 4/2006 | Biederman | H04L 12/10 |
| | | | 714/11 |
| 2006/0164108 A1 * | 7/2006 | Herbold | H04L 12/10 |
| | | | 324/691 |
| 2006/0171399 A1 * | 8/2006 | Ferentz | H04L 12/10 |
| | | | 370/395.53 |
| 2006/0227884 A1 * | 10/2006 | Koga | H04B 3/54 |
| | | | 375/257 |
| 2007/0237323 A1 * | 10/2007 | Miyamoto | H04L 1/22 |
| | | | 379/413 |
| 2008/0201748 A1 * | 8/2008 | Hasek | H04N 21/2662 |
| | | | 725/111 |
| 2009/0201919 A1 | 8/2009 | Swartz | |
| 2009/0298470 A1 * | 12/2009 | Huber | H04W 76/10 |
| | | | 455/411 |
| 2010/0027469 A1 * | 2/2010 | Gurajala | H04M 15/8038 |
| | | | 370/328 |

(56) References Cited

U.S. PATENT DOCUMENTS

| | | |
|---|---|---|
| 2010/0071020 A1* | 3/2010 | Addington ............ H04H 20/78 725/132 |
| 2010/0074416 A1 | 3/2010 | Smith et al. |
| 2010/0192212 A1* | 7/2010 | Raleigh ............ G06Q 30/0207 726/7 |
| 2010/0205652 A1* | 8/2010 | Bouchard ......... G06Q 30/0269 707/769 |
| 2010/0217837 A1* | 8/2010 | Ansari ................ H04L 65/102 709/224 |
| 2010/0271951 A1* | 10/2010 | Dujardin ............ H04L 63/0272 370/316 |
| 2010/0318918 A1* | 12/2010 | Mahmoodshahi ...... H04L 45/00 715/752 |
| 2011/0004779 A1* | 1/2011 | Karam .................. H04L 12/10 713/340 |
| 2011/0077793 A1* | 3/2011 | Hsieh .................. H04L 12/10 700/297 |
| 2011/0093913 A1* | 4/2011 | Wohlert ............. H04L 63/0861 726/1 |
| 2011/0103371 A1* | 5/2011 | Russell ................ H04L 47/822 370/352 |
| 2011/0176666 A1* | 7/2011 | Reding .................. H04M 3/54 379/93.01 |
| 2011/0258466 A1* | 10/2011 | Lee ...................... H04L 12/10 713/300 |
| 2011/0310519 A1* | 12/2011 | Baba ...................... H04L 12/10 361/91.1 |
| 2012/0036220 A1* | 2/2012 | Dare ........................ G06F 8/61 709/217 |
| 2012/0096513 A1* | 4/2012 | Raleigh .................. H04W 8/18 709/224 |
| 2012/0307995 A1 | 12/2012 | Bellomo et al. |
| 2012/0317426 A1* | 12/2012 | Hunter, Jr. ........ H04L 12/40045 713/300 |
| 2013/0149912 A1* | 6/2013 | Oberski ................ H01R 24/64 439/676 |
| 2014/0314412 A1* | 10/2014 | Soto ..................... H04B 10/272 398/67 |
| 2015/0055608 A1* | 2/2015 | Egner ................... H04W 4/025 370/329 |
| 2015/0078756 A1* | 3/2015 | Soto ...................... H04B 10/25 398/116 |
| 2015/0229432 A1* | 8/2015 | Shellhammer ........ H04L 5/0037 398/58 |
| 2015/0304508 A1* | 10/2015 | Peker .................. H04M 19/08 379/24 |
| 2015/0347683 A1* | 12/2015 | Ansari .................. G16H 10/60 726/7 |
| 2015/0365256 A1* | 12/2015 | Afkhami ................ H04B 3/32 375/257 |
| 2016/0028447 A1* | 1/2016 | Etkin ................... H04B 7/024 455/561 |
| 2016/0064938 A1* | 3/2016 | Balasubramanian ... H04L 12/10 307/11 |
| 2016/0234079 A1 | 8/2016 | Lee et al. |
| 2016/0248641 A1 | 8/2016 | Bhatia et al. |
| 2016/0249223 A1* | 8/2016 | Egner ................... H04W 40/12 |
| 2016/0273722 A1* | 9/2016 | Crenshaw ............ H02J 7/0047 |
| 2016/0309045 A1* | 10/2016 | Peker .................. H04M 19/08 |
| 2016/0330334 A1* | 11/2016 | Cooper ............... H04M 19/08 |
| 2016/0373588 A1* | 12/2016 | Raleigh ............... H04L 12/1407 |
| 2017/0026188 A1* | 1/2017 | Herzel .................... G06F 1/30 |
| 2017/0048085 A1* | 2/2017 | Munoz ................ H04L 5/0007 |
| 2017/0054502 A1* | 2/2017 | Kim ................ H04B 10/25754 |
| 2017/0063614 A1 | 3/2017 | Hartwig |
| 2017/0111120 A1* | 4/2017 | Soto .................... H04M 19/08 |
| 2017/0237506 A1* | 8/2017 | Soto ...................... H04B 10/00 398/116 |
| 2017/0250828 A1* | 8/2017 | Buchanan ............... H02J 3/02 |
| 2017/0325141 A1* | 11/2017 | Laliberte ............... H04W 76/11 |
| 2017/0351309 A1* | 12/2017 | Hartnett ................ H04L 12/10 |
| 2017/0373879 A1* | 12/2017 | Zhang .................. G06F 13/426 |
| 2018/0006683 A1* | 1/2018 | Peker .................... H04M 19/02 |
| 2018/0124235 A1* | 5/2018 | Kim ...................... H04L 1/0006 |
| 2018/0219635 A1* | 8/2018 | Sipes, Jr. ............. H04N 23/65 |
| 2018/0233862 A1* | 8/2018 | Brennan .............. H01R 13/703 |
| 2018/0269992 A1* | 9/2018 | Torres ................ H04B 10/2589 |
| 2019/0036567 A1* | 1/2019 | Peker .................... H04L 12/10 |
| 2019/0113960 A1* | 4/2019 | El Kolli .................. G06F 1/24 |
| 2019/0124262 A1* | 4/2019 | El Kolli ................ H04N 7/181 |
| 2019/0199538 A1* | 6/2019 | Lagrange .................. G06F 1/24 |
| 2019/0229768 A1 | 7/2019 | Jeremy et al. |
| 2019/0230181 A1* | 7/2019 | Wang ..................... H04W 4/60 |
| 2019/0260879 A1* | 8/2019 | Raleigh ................ H04M 15/83 |
| 2019/0361509 A1* | 11/2019 | Boban .................... H04L 12/10 |
| 2020/0007243 A1* | 1/2020 | Soto .................... H04L 12/2898 |
| 2020/0027629 A1* | 1/2020 | Craft, Jr. .............. G02B 6/4454 |
| 2020/0065784 A1 | 2/2020 | Philipson et al. |
| 2020/0067720 A1* | 2/2020 | Hartnett ................ H04L 12/10 |
| 2020/0204382 A1* | 6/2020 | Lagrange .......... H04L 12/40039 |
| 2020/0225655 A1* | 7/2020 | Cella ................. G06F 18/2178 |
| 2020/0274777 A1 | 8/2020 | Liu et al. |
| 2020/0275025 A1* | 8/2020 | El Kolli .................. G06F 1/26 |
| 2020/0351117 A1 | 11/2020 | Barnett, Jr. |
| 2020/0380441 A1 | 12/2020 | Altekar |
| 2021/0042872 A1 | 2/2021 | Simpson |
| 2021/0075520 A1* | 3/2021 | Soto .................... H04L 12/10 |
| 2021/0218571 A1* | 7/2021 | Ansari ................ H04M 15/705 |
| 2021/0409070 A1* | 12/2021 | Corbel ................... G01S 7/521 |
| 2022/0014512 A1* | 1/2022 | Raleigh .................. H04L 63/20 |
| 2022/0021548 A1* | 1/2022 | Goergen ................ G06F 1/266 |
| 2022/0052911 A1 | 2/2022 | Haag et al. |
| 2022/0116793 A1* | 4/2022 | Osinski ................ H04M 15/41 |
| 2022/0166523 A1* | 5/2022 | Soto ..................... H04B 10/806 |
| 2022/0407561 A1* | 12/2022 | Schafer ................ H01Q 9/0407 |
| 2023/0009431 A1* | 1/2023 | Synstelien .......... H04L 41/5061 |
| 2023/0011720 A1* | 1/2023 | Synstelien ............. H04L 12/10 |
| 2023/0038555 A1 | 2/2023 | Kapur et al. |
| 2023/0300035 A1* | 9/2023 | Synstelien .............. H04L 41/32 709/223 |
| 2023/0353455 A1 | 11/2023 | Zhu et al. |
| 2024/0080307 A1* | 3/2024 | Synstelien .......... H04L 12/4633 |
| 2024/0129144 A1* | 4/2024 | Synstelien .......... H04L 12/2869 |
| 2024/0179075 A1* | 5/2024 | Synstelien .......... H04L 41/0806 |

FOREIGN PATENT DOCUMENTS

| | | |
|---|---|---|
| CN | 118120184 | 5/2024 |
| CN | 118120206 | 5/2024 |
| EP | 1050163 A1 | 11/2000 |
| EP | 2262275 | 4/2014 |
| FR | 2990091 A1 | 11/2013 |
| WO | 2007143712 | 12/2007 |
| WO | WO-2022228852 A1 | 11/2022 |
| WO | WO-2023283633 A1 | 1/2023 |
| WO | WO-2023283635 A1 | 1/2023 |

OTHER PUBLICATIONS

"International Application Serial No. PCT US2022 073555, International Preliminary Report on Patentability mailed Jan. 18, 2024", 11 pgs.

"U.S. Appl. No. 18/436,526, Non Final Office Action mailed Apr. 22, 2024", 14 pgs.

"U.S. Appl. No. 18/436,526, Response filed Jul. 22, 2024 to Non Final Office Action mailed Apr. 22, 2024", 15 pgs.

"U.S. Appl. No. 18/436,526, Notice of Allowance mailed Aug. 28, 2024", 7 pgs.

"Australian Application Serial No. 2022308737, First Examination Report mailed Aug. 26, 2024", 5 pgs.

"Australian Application Serial No. 2022307935, First Examination Report mailed Oct. 3, 2024", 4 pgs.

"U.S. Appl. No. 18/436,526, Notice of Allowability mailed Dec. 5, 2024", 2 pgs.

"U.S. Appl. No. 17/804,161, Non Final Office Action mailed Jul. 29, 2022", 7 pgs.

"U.S. Appl. No. 17/804,161, Notice of Allowance mailed Dec. 9, 2022", 2 pgs.

(56) References Cited

OTHER PUBLICATIONS

"U.S. Appl. No. 17/804,161, Notice of Allowance mailed Nov. 30, 2022", 6 pgs.

"U.S. Appl. No. 17/804,161, Response filed Oct. 31, 2022 to Non Final Office Action mailed Jul. 29, 2022", 14 pgs.

"U.S. Appl. No. 17/804,162, Corrected Notice of Allowability mailed Aug. 2, 2023", 2 pgs.

"U.S. Appl. No. 17/804,162, Examiner Interview Summary mailed May 10, 2023", 2 pgs.

"U.S. Appl. No. 17/804,162, Final Office Action mailed Feb. 24, 2023", 37 pgs.

"U.S. Appl. No. 17/804,162, Non Final Office Action mailed Aug. 18, 2022", 5 pgs.

"U.S. Appl. No. 17/804,162, Non Final Office Action mailed Dec. 28, 2022", 27 pgs.

"U.S. Appl. No. 17/804,162, Notice of Allowance mailed Jun. 22, 2023", 24 pgs.

"U.S. Appl. No. 17/804,162, Response filed Jan. 31, 2023 to Non Final Office Action mailed Dec. 28, 2022", 12 pgs.

"U.S. Appl. No. 17/804,162, Response filed Apr. 24, 2023 to Final Office Action mailed Feb. 24, 2023", 14 pgs.

"U.S. Appl. No. 17/804,162, Response filed Nov. 15, 2022 to Non Final Office Action mailed Aug. 18, 2022", 17 pgs.

"U.S. Appl. No. 18/154,970, 312 Amendment filed Oct. 31, 2023", 6 pgs.

"U.S. Appl. No. 18/154,970, Corrected Notice of Allowability mailed Nov. 8, 2023", 2 pgs.

"U.S. Appl. No. 18/154,970, Corrected Notice of Allowability mailed Dec. 7, 2023", 2 pgs.

"U.S. Appl. No. 18/154,970, Notice of Allowance mailed Oct. 27, 2023", 10 pgs.

"U.S. Appl. No. 18/154,970, Preliminary Amendment filed Jun. 8, 2023", 7 pgs.

"BT PLC Request to extend scope of DTS 101 548-1", ETSI Draft, ATTMTM6(18)000042, European Telecommunications Standards Institute (ETSI), vol. WG ATTM TM6 Hireline Access Network System, <docbox.etsi.org/ATTM/TM6/05-CONTRIBUTIONS/2018/ATTMTM6(18)000042_Request_to_extend_scope_of_DTS_101_548>, (Sep. 26, 2018), 1-2.

"International Application Serial No. PCT/US2022/073552, International Search Report mailed Oct. 11, 2022", 4 pgs.

"International Application Serial No. PCT/US2022/073552, Written Opinion mailed Oct. 11, 2022", 7 pgs.

"International Application Serial No. PCT/US2022/073555, International Search Report mailed Oct. 24, 2022", 5 pgs.

"International Application Serial No. PCT/US2022/073555, Written Opinion mailed Oct. 24, 2022", 7 pgs.

Li, Beier, "Performance enhancement in copper twisted pair cable communications", PhD diss., De Montfort University, [Online]. Retrieved from the Internet: https://core.ac.uk/download/pdf/228183116.pdf, (2016), 162 pgs.

"Australian Application Serial No. 2022308737, Response filed Jul. 24, 2025 to First Examination Report mailed Aug. 26, 2024", 86 pgs.

"Australian Application Serial No. 2022308737, Subsequent Examiners Report mailed Jul. 29, 2025", 4 pgs.

"Australian Application Serial No. 2022308737, Subsequent Examination Report mailed Aug. 22, 2025", 3 pgs.

"Australian Application Serial No. 2022308737, Response filed Aug. 21, 2025 to Subsequent Examiners Report mailed Jul. 29, 2025", W English Claims, 84 pgs.

"European Application Serial No. 22757785.5, Response to Communication pursuant to Rules 161(2) and 162 EPC filed Aug. 19, 2024", 6 pages.

"European Application Serial No. 22757786.3, Response to Communication pursuant to Rules 161(2) and 162 EPC filed Aug. 19, 2024", 5 pages.

\* cited by examiner

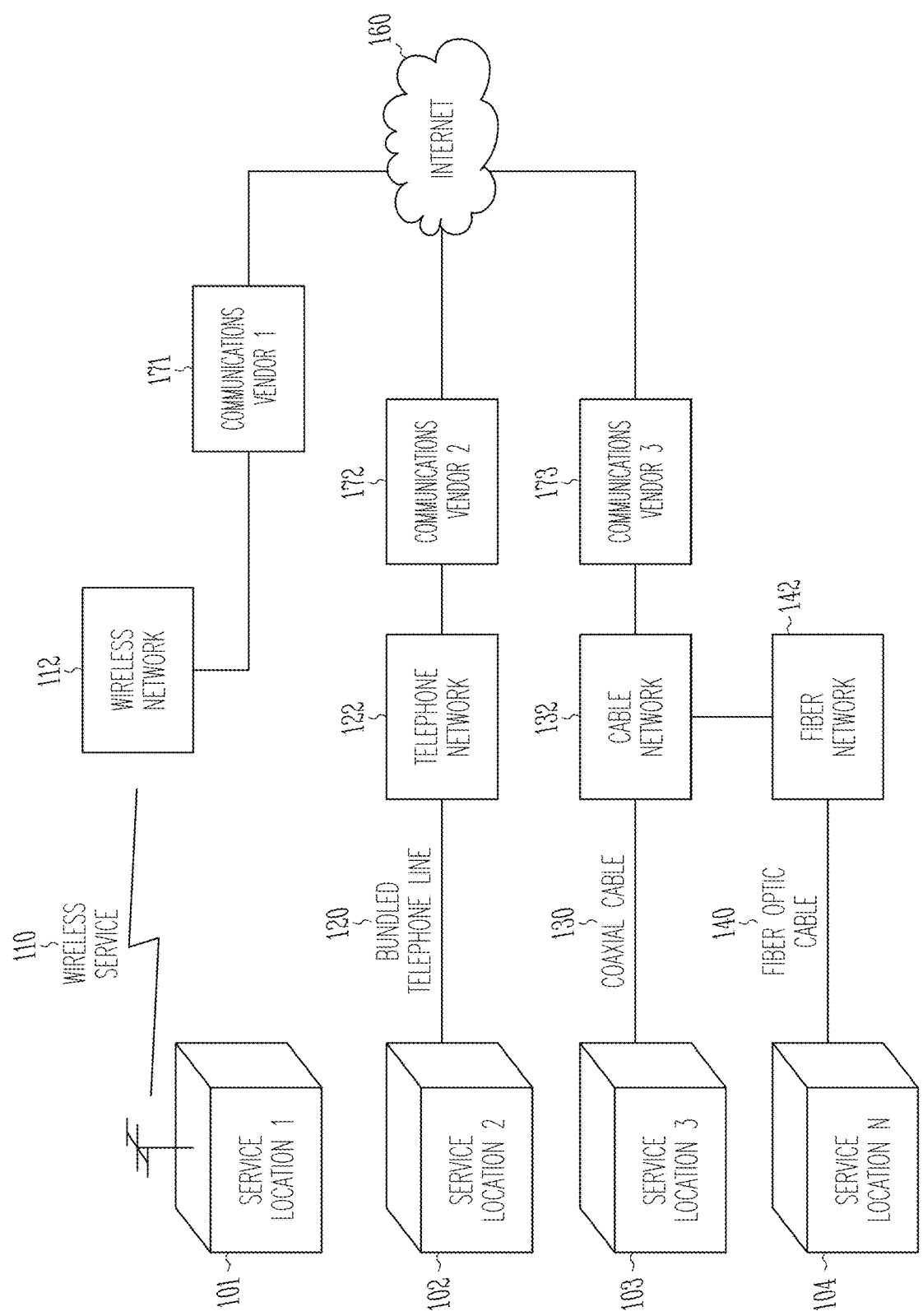

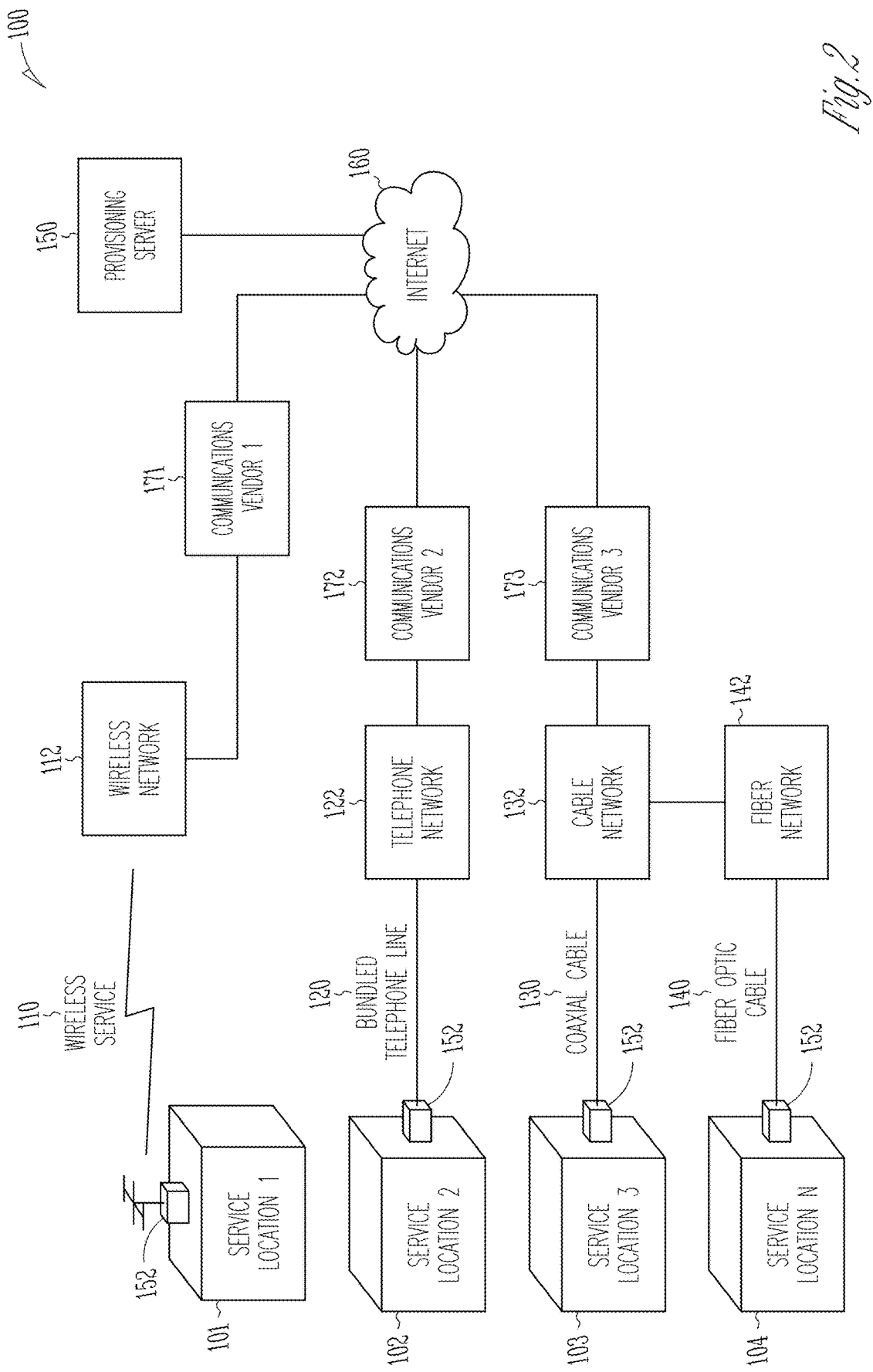

Fig. 3B

LED DEFINITION — 360

| FUNCTION | SILK PRINT | COLOR | DEFINITIONS |
|---|---|---|---|
| POWER STATUS | PWR | GREEN | ON = POWER IS ON |
| | | | OFF = POWER IS DOWN |
| RF LINK STATUS | RL | DUAL COLOR | GREEN ON = READYLINK IS UP AND SIGNAL QUALITY IS NORMAL (>=50Mbps) |
| | | | YELLOW ON = READYLINK IS UP AND SIGNAL QUALITY IS POOR (<50Mbps) |
| | | | OFF = READYLINK IS DOWN |
| RPF POWER STATUS | RPF | YELLOW | ON = READYLINK PORT RPF OUTPUT IS ENABLED |
| | | | OFF = READYLINK PORT RPF OUTPUT IS NOT ENABLED |
| | | YELLOW | ON = PSE OUTPUT POWER TO PD |
| | | | OFF = NO POWER OUTPUT |
| GE PORT STATUS ON RJ45 CONNECTORS | GE1 GE2 | GREEN | SOLID ON = PORT LINK IS UP |
| | | | BLINK = PORT LINK IS UP AND ACTIVE |
| | | | OFF = PORT LINK IS DOWN |

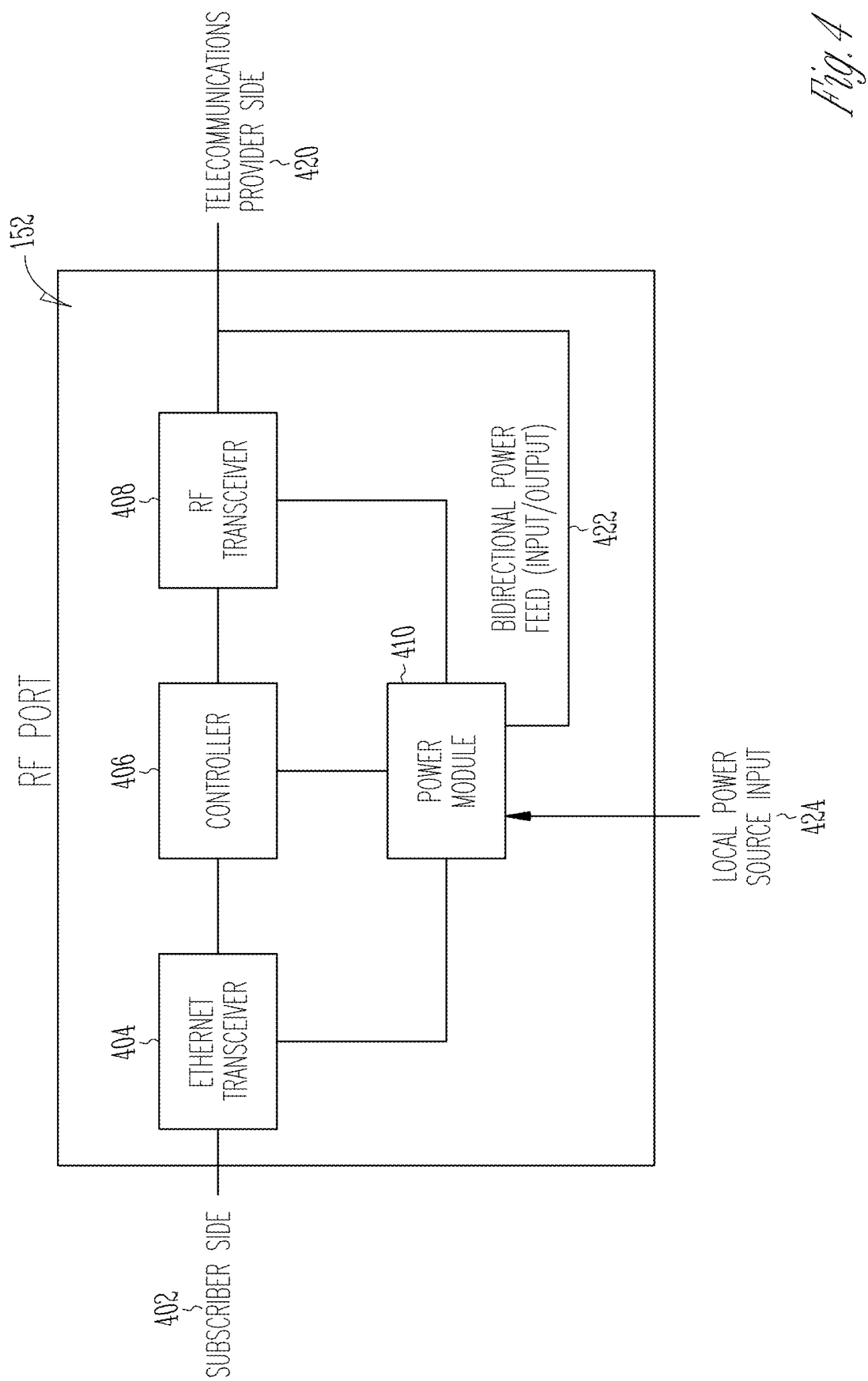

BIDIRECTIONAL POWER FEED DIGITAL COMMUNICATION DEVICE

CROSS REFERENCE TO RELATED APPLICATIONS

This application is a continuation of U.S. patent application Ser. No. 17/804,162, filed on May 26, 2022, which claims the benefit under 35 U.S.C. § 119(e) of U.S. Provisional Patent Application 63/203,141, filed Jul. 9, 2021, the disclosures of which are hereby incorporated by reference herein in their entirety.

This application is related to commonly assigned, U.S. Provisional Patent Application Ser. No. 63/203,140, entitled "FACILITATING AND PROVISIONING CUSTOMER BROADBAND TRANSPORT SERVICE", filed on Jul. 9, 2021, which is hereby incorporated by reference in its entirety.

BACKGROUND

Subscribers of digital communications at a residence or business (the "service location") have a number of options based on the connection options available at the service location. Traditional communications employ cable, fiber, wireless, and plain-old-telephone connection options. Each subscriber service provider has challenges deploying service to new subscribers and existing subscribers who request new service.

Cable and fiber networks require a cable and/or fiber drop at the service location to establish a digital connection. Cellular and satellite networks require wireless equipment for digital access. Conventional telephone lines can be used with modems supporting DSL (digital subscriber loop) communications. However, each service typically involves substantial installation and programming to ensure the subscriber has a proper connection.

Conventional wireless network services suffer from the issues commonly found with wireless networks, such as signal dropout, fading, interference, and relatively modest uplink transmission rates. Different networks may offer vastly different service connections depending on the connection options at a particular location. Conventional digital cable or optical fiber systems provide relatively fast communications but typically require a large capital investment associated with installing and maintaining cable and fiber networks and provisioning services to users.

Conventional plain telephone lines typically supported substantially lower communications speeds than cable systems and may employ DSL (digital subscriber loop) communications featuring additional overhead for provisioning access both by virtue of equipment and establishing services to users.

These services typically required a technician to visit the location to install necessary equipment and to ensure signal strength and connections were adequate for the desired service. Accordingly, such technician visits involved service delay to coordinate with the subscriber and for technician personnel to be deployed to ensure connection. In addition, the necessary equipment typically requires direct access to an electrical outlet to provide power to the devices.

There is a need in the art for a system for easily and quickly deploying and provisioning high speed digital communications to users at residential and commercial locations that may or may not have direct access to an electrical outlet. Such a system should be easy and efficient to set up and use. Such a system should provide the subscriber with high speed digital communications without a power outlet or when power is unavailable, preferably minimizing or reducing the delays, difficulties, and cost associated with scheduling a technician to visit the service location to establish service.

SUMMARY

The present subject matter provides an apparatus and method for providing bidirectional power feed digital communication devices for service locations. The device further includes a bidirectional power feed connection configured to receive power from or provide power to an external device via a multiple conductors for digital communications, such as radio frequency (RF) modulation communications over multiple conductors between the digital communication port and the external device.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present patent application.

FIG. 1 illustrates a communications environment in which the present subject matter may be practiced.

FIG. 2 illustrates various deployments of a digital communications port of the present subject matter according to various embodiments of the present subject matter.

FIG. 3B is a table showing light emitting diode (LED) assignment for an exemplary digital communication port according to one embodiment of the present subject matter.

FIG. 4 is a block diagram showing an example of a digital communication port employing RF modulation according to various embodiments of the present subject matter.

DETAILED DESCRIPTION

Figure 3A:
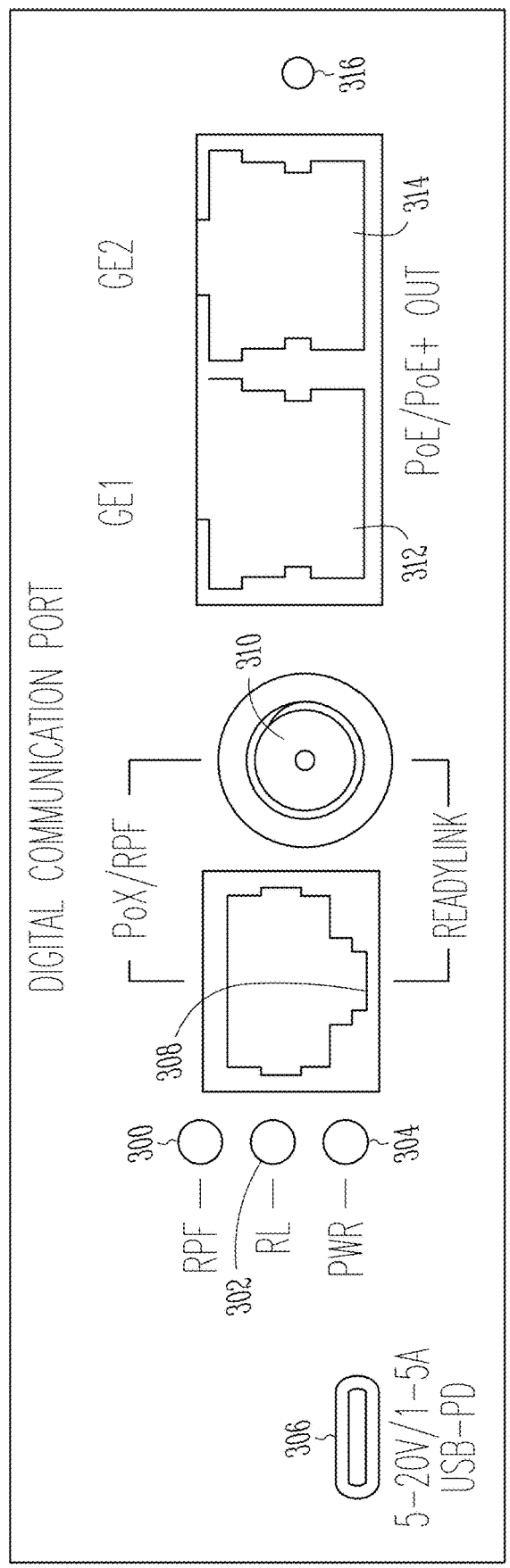
FIG. 3A is an exemplary digital communication port showing various connection options according to one embodiment of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter provides digital communication devices, including digital communication ports, digital communication multi-ports and digital communication vaults that provide high-speed internet deployment using multiple conductor connections, such as twisted wire (e.g., twisted pair or any number of twisted conductors) or coaxial cable connections, for digital radio frequency (RF) modulation communications over the multiple conductors, and further using the at least some of the multiple conductors used in the RF modulation communications for bidirectional power feed supplying power to and/or from each of the digital communication ports, digital communication multi-ports and digital communication vaults.

The present subject matter provides an intelligent power sourcing system that allows devices in the system that are powered an ability to source power to additional devices in the system. In various embodiments the system enables ports of the devices to source power regardless of whether the device is in the forward path or the reverse path of other devices needing power. The system also allows for multiple ports in series to be powered if needed by the particular network. If multiple ports in series require power, each port receiving power can relay it to the next port in need of power. Accordingly, the system enables a power relay function to distribute power to ports in need of it, whether in series or parallel. In various embodiments, power and data are relayed over the same electrical connection.

FIG. 1 illustrates a communications environment in which the present subject matter may be practiced. The communications environment 100 may include a number of service locations 101, 102, 103, 104. A plurality of service locations may be used or deployed using the present subject matter. The service locations 101, 102, 103, 104 represent examples of locations of subscribers of digital communications at a residence or business. The service locations 101, 102, 103, 104 may have a number of options for digital communications based on the connection options available at the service location. Each location may include one or more communications options employing cable, fiber, wireless, and telephone connection options. In the exemplary embodiments, service location 101 has wireless service 110 for digital communications connected to a wireless network 112 to provide access to the internet 160. Service location 102 has bundled telephone lines 120 for digital communications connected to a telephone network 122 to provide access to the internet 160. Service location 103 has coaxial cable 130 for digital communications connected to a cable network 132 to provide access to the internet 160. Service location 104 has fiber optic cable 140 for digital communications connected to a cable network 132 via a fiber network 142 to provide access to the internet 160.

In various embodiments, one or more service locations 101, 102, 103, 104 may include more than one option for connection to the internet 160. For example, a service location may include any combination of wireless 110, telephone lines 120, coaxial cables 130 and fiber optic cables 140, and a user at such a service location may select the type of connection based on availability, cost, speed, preferred vendor, and/or personal preference. A number of communication vendors 171, 172, 173 (or subscribers service providers) may be available to enable access to the internet 160 from the one or more service locations 101, 102, 103, 104. Each subscriber service provider has challenges deploying service to new subscribers and existing subscribers who request new service, and who may not have ready access to a power connection to provide power to the required equipment.

FIG. 2 illustrates various deployments of a digital communications port 152 of the present subject matter according to various embodiments of the present subject matter. A user at a service location 101, 102, 103, 104 may be provided with a digital communications port 152 of the present subject matter, such as the digital communications port 152 shown in FIG. 3A. The digital communications port 152 includes one or more inputs for connecting to available connection options at the service location. For example, the digital communications port 152 may include inputs compatible with wireless service 110, inputs compatible with bundled telephone lines 120, inputs compatible with coaxial cables 130, and/or inputs compatible with fiber optic cables 140. The user may connect the digital communications port 152 to one or more of the connections at a given service location, in various embodiments. When connecting the digital communications port 152, the user may access an application or software (such as the application and software discussed in co-pending, commonly assigned, U.S. Provisional Patent Application Ser. No. 63/203,140, entitled "FACILITATING AND PROVISIONING CUSTOMER BROADBAND TRANSPORT SERVICE", filed on Jul. 9, 2021, which is hereby incorporated by reference herein in its entirety) from a user's computer or personal device to interface with a provisioning server 150 over the internet 160. As will be shown in greater detail below, the provisioning server 150 interacts with the digital communications port 152 to provision the available connection resources at the service location 101, 102, 103, 104 to provide an internet connection for the user.

FIG. 3A is an exemplary digital communication port 152 showing various connection options according to one embodiment of the present subject matter. The digital communications port 152 includes a number of input connections, output connections, buttons, and/or indicator lights. In various embodiments, the digital communications port 152 may include a different number of input connections, output connections, buttons, and/or indicator lights, without departing from the scope of the present subject matter. In the depicted embodiment, the digital communication port 152 includes a reverse power feed (RPF) status indicator light 300, communication status indicator lights 302, a power status indicator light 304, a universal service bus (USB-C) input 306, a twisted-pair telephone connector input/output 308, a coaxial cable connector input/output 310, a pair of ethernet cable connector input/outputs 312, 314, and a reset button 316. The reset button 316 is recessed, in various embodiments. According to various embodiments, one or more of the USB-C input 306, the twisted-pair telephone connector input/output 308, the coaxial cable connector input/output 310, or the pair of ethernet cable connector input/outputs 312, 314 may be used to provide power to and/or from the digital communications port 152. For example, in one embodiment twisted-pair telephone connector input/output 308 may be used as RPF connectors to receive power or to provide power to or from other devices, such as other digital communication ports 152. The RPF is enabled based on the input voltage of the USB-C input 306, in various embodiments. In another example, in one embodiment the pair of ethernet cable (RJ45) connector input/outputs 312, 314 may be used as power-over-ethernet (PoE) connectors to receive power or to provide power to or from other devices, such as other digital communication ports 152. The PoE power output on RJ45 ethernet ports can be switched on and off using software, in various embodiments.

In various embodiments, the present subject matter provides a digital communication port including communication electronics for communicating with at least one digital communications connector. In various embodiments, the digital communications port further includes a bidirectional power feed connection configured to receive power from or provide power to an external device via a two conductor connection configured for digital communications between the digital communication port and the external device. The digital communications include radio frequency (RF) modulation (or RF modulation communications), in various embodiments. In various embodiments, the RF modulation communications include one or more of discrete multi-tone (DMT) modulation (such as G.Fast or data modulation), orthogonal frequency division multiplexing (OFDM) (such as G.hn or multimedia over coax alliance (MoCA)), coded orthogonal frequency-division multiplexing (CODFDM), ultra-wideband (UWB) (such as ultra wideband, ultra-wide band and ultraband), pulse-position modulation, or orthogonal frequency-division multiple access (OFDMA). Other types of RF modulation communications can be used without departing from the scope of the present subject matter. The description below may use G.hn or G.Fast standard communications as examples, but it is understood that any type of RF modulation communications may be used with the present system.

FIG. 3B is a table 360 showing light emitting diode (LED) assignment for an exemplary digital communication port 152 according to one embodiment of the present subject matter. A power status indicator (such as 304 in FIG. 3A) is illuminated when power is supplied to the device. A link status indicator (such as 302) is green when the RF modulation communications signal (for example, the G.hn or G.Fast signal) has signal quality of greater than or equal to 50 Mbps, and is yellow when RF modulation communications signal has signal quality of less than or equal to 50 Mbps, and is off when no signal is detected. Other bit rates may be specified without departing from the present subject matter. A RPF power status indicator (such as 300) is on when the RPF port is enabled. A GE port status indicator (adjacent inputs/outputs 312, 314) has a yellow light when power is supplied from the PoE indicators and a green light that is solid when the port link is up and blinks when the link is up and active. Various colors of LEDs may be used without departing from the scope of the present subject matter.

FIG. 4 is a block diagram showing an example of a digital communication port 152 employing an RF modulation communications according to various embodiments of the present subject matter. The digital communication port 152 includes an ethernet transceiver 404 configured to interface with a subscriber side 402 and a RF modulation transceiver 408 (for example, a G.hn or G.Fast transceiver 408) configured to interface with a telecommunications provider side 420, in various embodiments. In the depicted embodiment, the digital communication port 152 includes a processor or controller 406 programmed to control operation of the ethernet transceiver 404 and the transceiver 408, and further includes a power module 410 to provide electrical power to the ethernet transceiver 404, the transceiver 408, and the controller 406. In some embodiments, the port 152 receives power from a local power source input 424. In various embodiments of the present subject matter, the port receives or provides power from a bidirectional power feed input/output 422 (sometimes referred to herein as a reverse power feed (RPF)). The bidirectional power feed input/output uses the communication conductors (such as coaxial cable or twisted wire conductors) employed by the RF modulation communications (for example, Win, G.Fast, or other RF modulation standards communications). In various embodiments, RPF input/output can provide power or receive power, thus also referred to as a bidirectional power feed input/output. The ports and vaults of the present subject matter provide a reverse power port, in various embodiments. The ports and vaults of the present subject matter provide a forward power port, in various embodiments. The ports and vaults of the present subject matter provide a bidirectional power port, in various embodiments. Thus, the devices of the present subject matter provide may provide a reverse power path, a forward power path, or a bidirectional power path, in various embodiments. In various embodiments, the devices of the present subject matter provide a power relay function.

Figure 6:
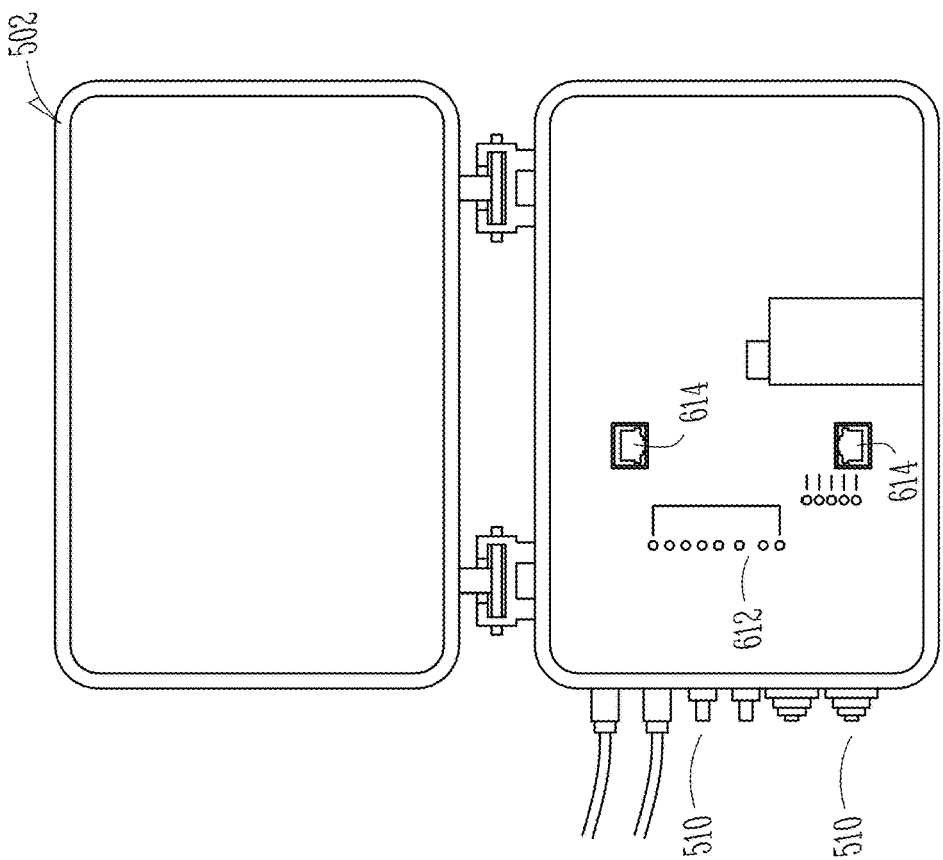
FIGS. 5-6 illustrate an exemplary digital communication vault showing various connection options according to one embodiment of the present subject matter.
Figure 5:
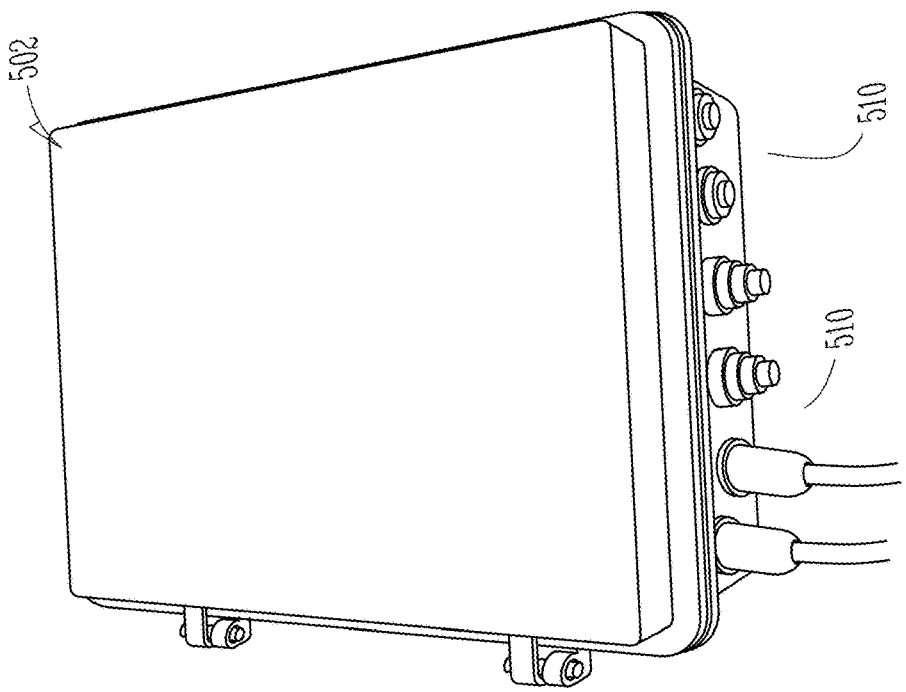

FIGS. 5-6 illustrate an exemplary digital communication vault showing various connection options according to one embodiment of the present subject matter. The digital communication vault 502 includes a number of input connections, output connections, buttons, and/or indicator lights. In various embodiments, the digital communication vault 502 may include a different number of input connections, output connections, buttons, and/or indicator lights, without departing from the scope of the present subject matter. The digital communication vault 502 may be used on or near an exterior or interior of a building or service location, may be mounted with a wall, strand, or pole-mount bracket, and may interface with one or more digital communication ports 152 In the depicted embodiment, the digital communication vault 502 includes external connectors 510, internal connectors 614 within a housing having a weatherproof seal, and a plurality of status indicator lights 612. The housing may include a diecast aluminum allow, in various embodiments. The external connectors 510 may include one 2 or 4-core fiber jumper, one 20-pair copper pigtail, one 1.2V/3A type-C power outlet, and two F connectors for 50 Hz synchronization signal input and output. The jumper and pigtail fit within a waterproof ⅝×24 cable gland, in an embodiment.

According to various embodiments, one or more of the external connectors 510 or the internal connectors 614 may be used to provide power to and/or from the digital communication vault 502. For example, in one embodiment a twisted-pair telephone connector input/output may be used as an RPF connector to receive power or to provide power to or from other devices, such as other digital communication vaults 502 or one or more digital communication ports 152. In various embodiments, each RF modulation communications port on the digital communication vault 502 acts as a power device (PD) complying with IEEE 802.3at. In this example, the minimum power required is 15 Watts on the 12 Volt domain, when only one digital communication port is active. The power output depends on the power loss of the RPF system, including cable resistance and PD power efficiency, in various embodiments.

Figure 7:
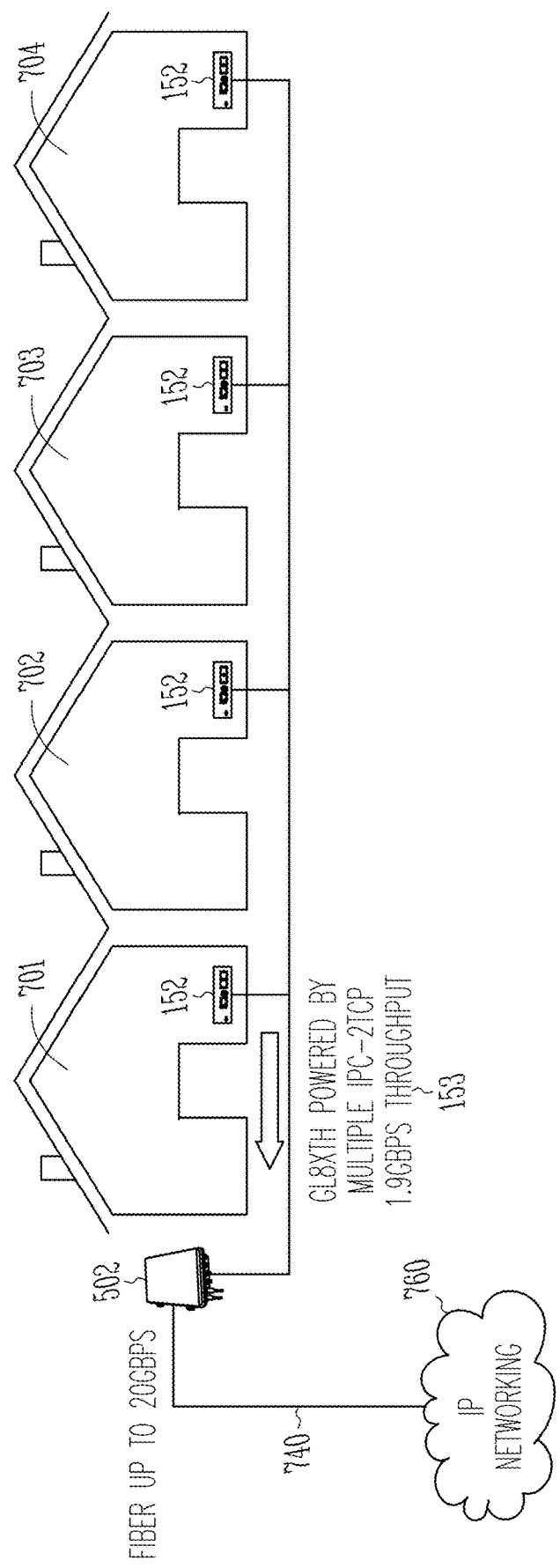
FIG. 7 illustrates a deployment of a digital communication vault and digital communication ports of the present subject matter according to one embodiment of the present subject matter.

FIG. 7 illustrates a deployment of a digital communication vault 502 and digital communication ports 152 of the present subject matter according to one embodiment of the present subject matter. In the depicted embodiment, a plurality of service locations 701, 702, 703, 704 each have a digital communication port 152 for internet service. The digital communication ports 152 are connected to a digital communication vault 502 that interfaces with a fiber optic cable 740 to provide internet via an internet protocol (IP) network 760. The digital communication vault 502 is connected to the digital communication ports 152 using communication conductors (such as twisted wire or coaxial conductors) employed by the RF modulation communications (for example, G.hn, G.Fast, and other RF modulation communications standards), in various embodiments. According to various embodiments, the digital communication vault 502 receives power via a reverse power feed (RPF) 153 using the communication conductors from one or more of the digital communication ports 152. In one embodiment, the digital communication vault 502 receives power via a reverse power feed (RPF) 153 using the communication conductors from all the connected digital communication ports 152.

Figure 8:
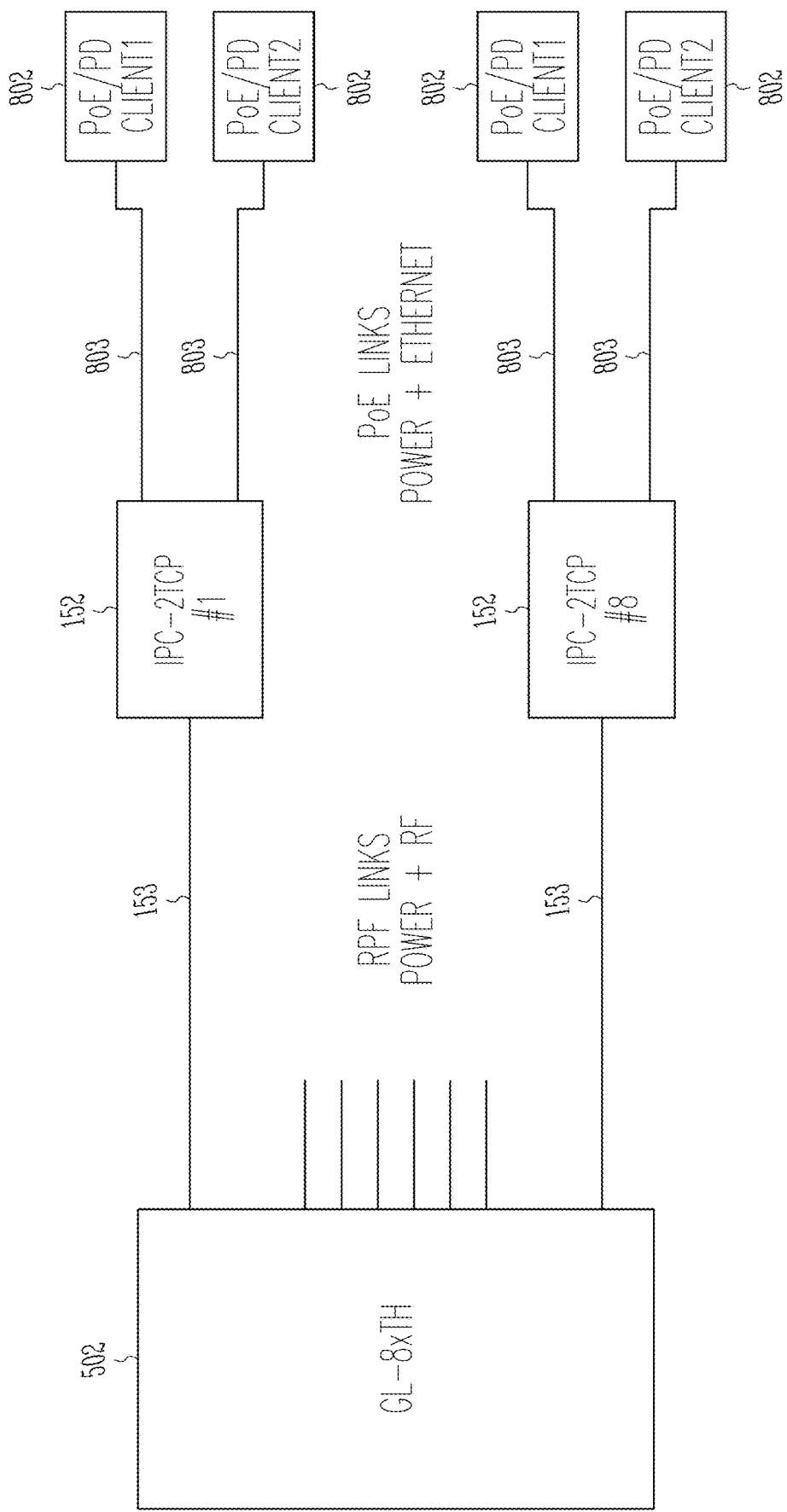
FIG. 8 is a block diagram showing an example of a digital communication vault and digital communication ports employing RF modulation according to various embodiments of the present subject matter.

FIG. 8 is a block diagram showing an example of a digital communication vault 502 and digital communication ports 152 employing an RF modulation communications according to various embodiments of the present subject matter. The digital communication ports 152 are connected to a digital communication vault 502 that interfaces with a network to provide internet via an internet protocol (IP) network 760. The digital communication vault 502 is connected to the digital communication ports 152 using the conductors that provide RF modulation communications, in various embodiments. According to various embodiments, the digital communication vault 502 receives power via a reverse power feed (RPF) 153 using the connections from one or more of the digital communication ports 152. In other embodiments, the digital communication vault 502 provides power via a reverse power feed (RPF) 153 using the connections to one or more of the connected digital communication ports 152. In the depicted embodiment, the digital communication ports 152 provide power to one or more client devices 802 using one or more power over ethernet (PoE) connections 803.

Figure 9:
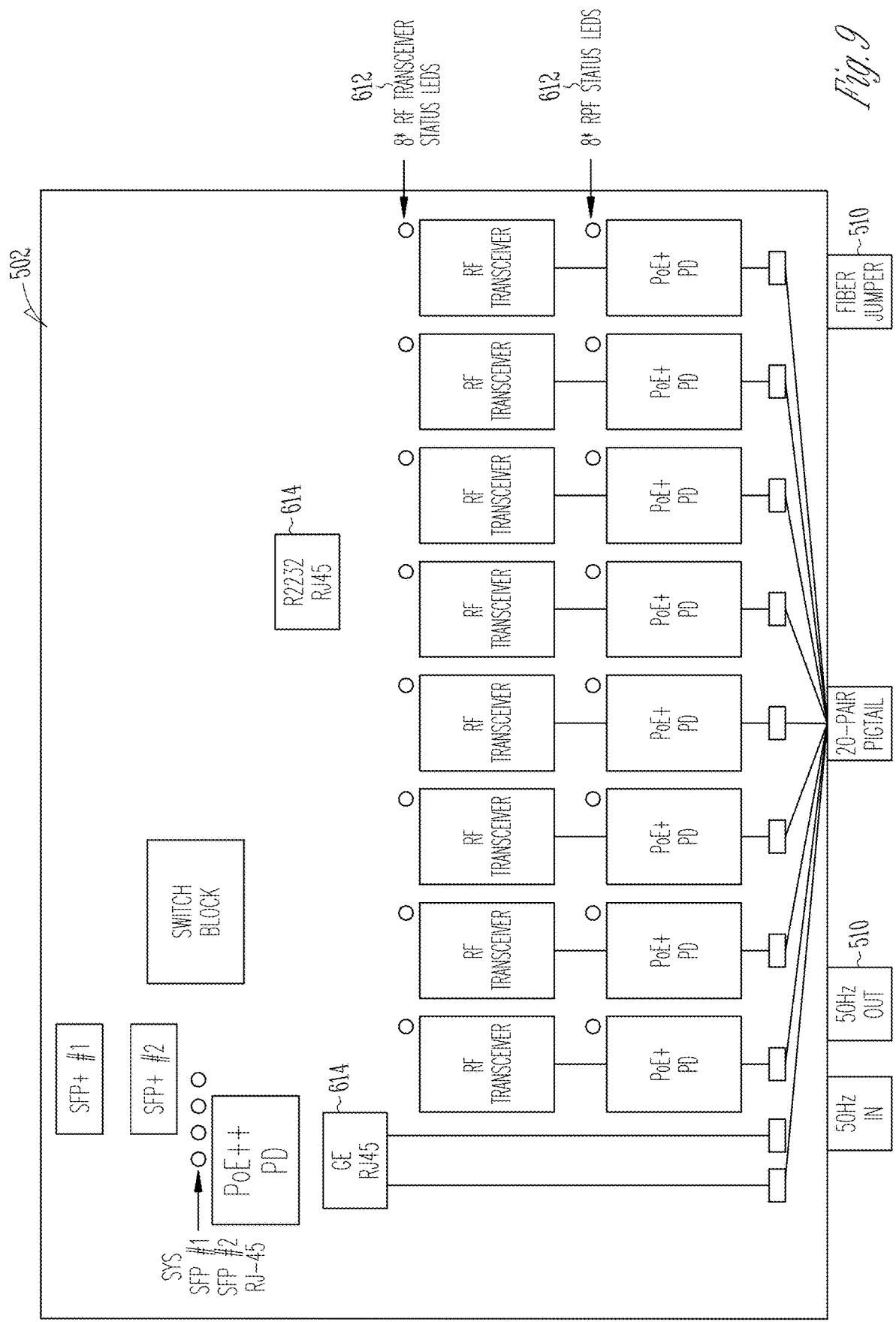
FIG. 9 is a block diagram showing an exemplary digital communication vault according to one embodiment of the present subject matter.

FIG. 9 is a block diagram showing an exemplary digital communication vault 502 according to one embodiment of the present subject matter. The digital communication vault 502 includes a number of input connections, output connections, buttons, and/or indicator lights. In various embodiments, the digital communication vault 502 may include a different number of input connections, output connections, buttons, and/or indicator lights, without departing from the scope of the present subject matter. The digital communication vault 502 may be used on or near an exterior to a building or service location, and may interface with one or more digital communication ports 152 in the depicted embodiment, the digital communication vault 502 includes external connectors 510, internal connectors 614 within a housing having a weatherproof seal, and a plurality of status indicator lights 612. According to various embodiments, one or more of the external connectors 510 or the internal connectors 614 may be used to provide power to and/or from the digital communication vault 502. For example, in one embodiment a twisted-wire telephone connector input/output may be used as an RPF connector to receive power or to provide power to or from other devices, such as other digital communication vaults 502 or one or more digital communication ports 152. In various other examples, coaxial cable connections may be used.

Figure 10:
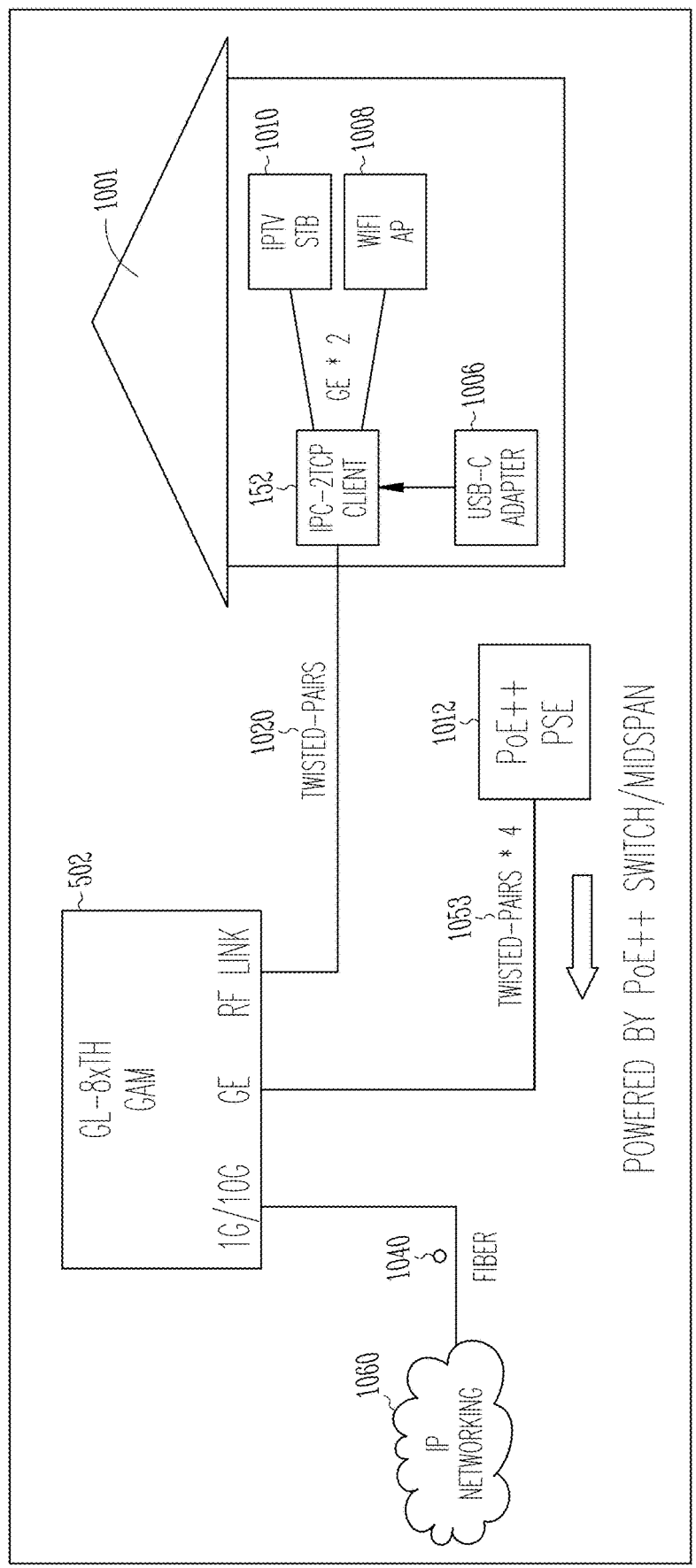
FIGS. 10-15 illustrate various deployments of digital communication vaults and digital communication ports of the present subject matter according to various embodiments of the present subject matter.

FIGS. 10-15 illustrate various deployments of digital communication vaults and digital communication ports of the present subject matter according to various embodiments of the present subject matter. In FIG. 10, a service location 1001 has a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication port 152 using a twisted wire or coaxial connection 1020 to provide RF modulation communications, in various embodiments. The digital communication port 152 is powered via a USB-C adapter 1006 that supports 5 to 20 Volts and 1 to 5 Amps, and is connected to a wireless internet (WiFi) access point 1008 and an internet protocol television set top box 1010 using ethernet connections, in an embodiment. In one embodiment, the digital communication vault 502 receives power via a power over ethernet (POE) connection 1053 from one or more PoE supplying devices 1012. In various embodiments herein, PoE may refer to PoE, PoE+, or PoE++ protocols, without departing from the scope of the present subject matter.

Figure 11:
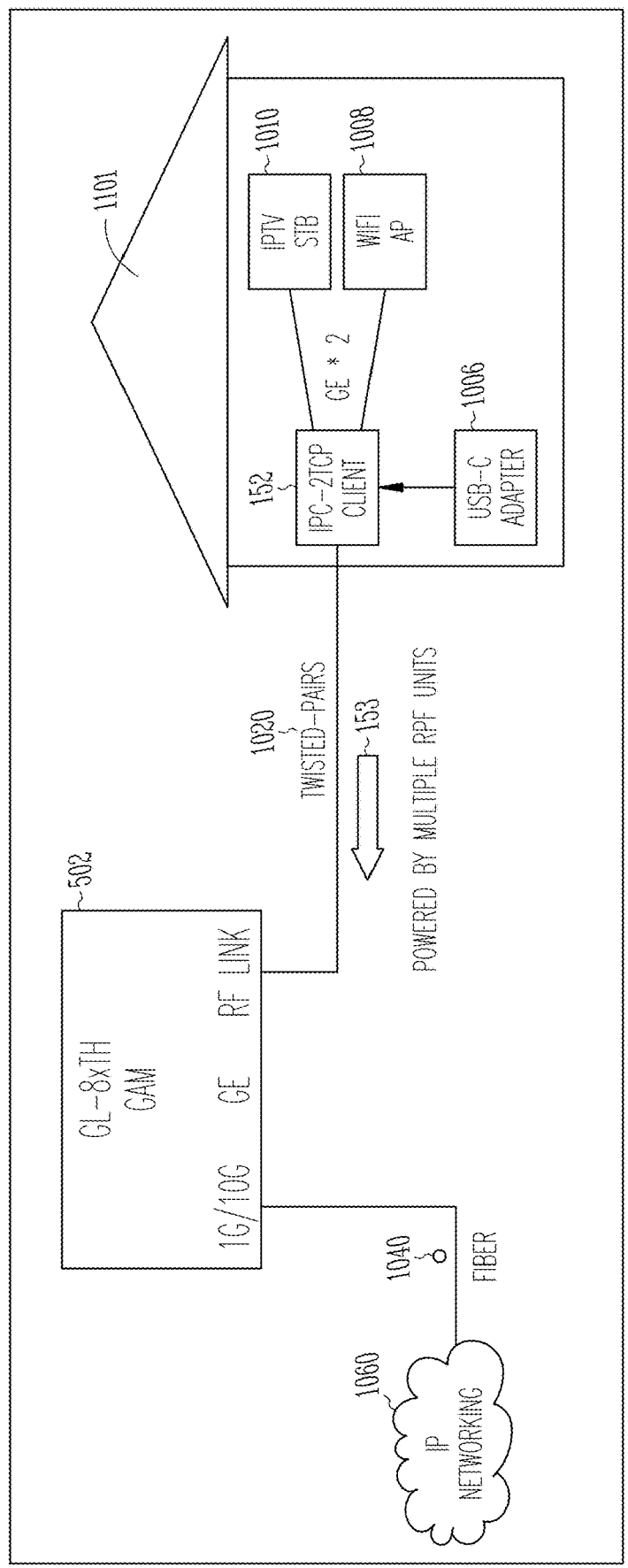

In FIG. 11, a service location 1101 has a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication port 152 using a twisted wire or coaxial connection 1020 to provide RF modulation communications, in various embodiments. The digital communication port 152 is powered via a USB-C adapter 1006, and is connected to a wireless internet (WiFi) access point 1008 and an internet protocol television set top box 1010 using ethernet connections, in an embodiment. According to various embodiments, the digital communication vault 502 receives power via a reverse power feed (RPF) 153 using connection 1020 from one or more of the digital communication ports 152.

Figure 12:
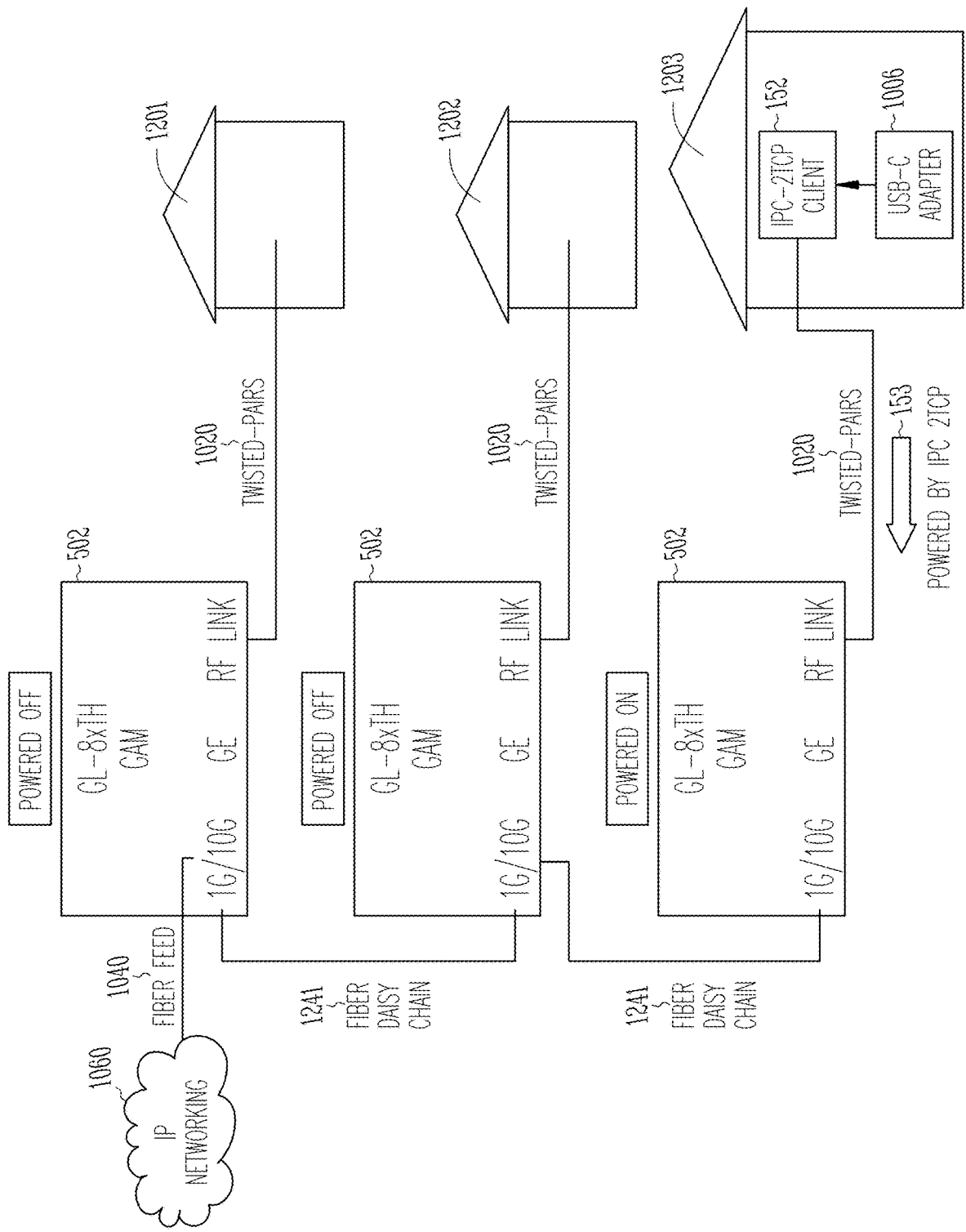

In FIG. 12, a plurality of service locations 1201, 1202, 1203 include a service location 1203 having a digital communication port 152 for internet service. The digital communication port 152 is connected to a digital communication vault 502 that interfaces with a fiber optic cable 1040 via a fiber optic daisy chain 1241 from other digital communication vaults 502 (that are not powered on) to provide internet via an internet protocol (IP) network 1060. The digital communication vault 502 includes an optical bypass accessory module inside an enclosure for fiber optic connections when powered off, and is connected to the digital communication port 152 using connection 1020 to provide RF modulation communications, in various embodiments. The digital communication port 152 is powered via a USB-C adapter 1006, in an embodiment. According to various embodiments, the digital communication vault 502 receives power via a reverse power feed (RPF) 153 using the connection from the digital communication port 152.

Figure 13:
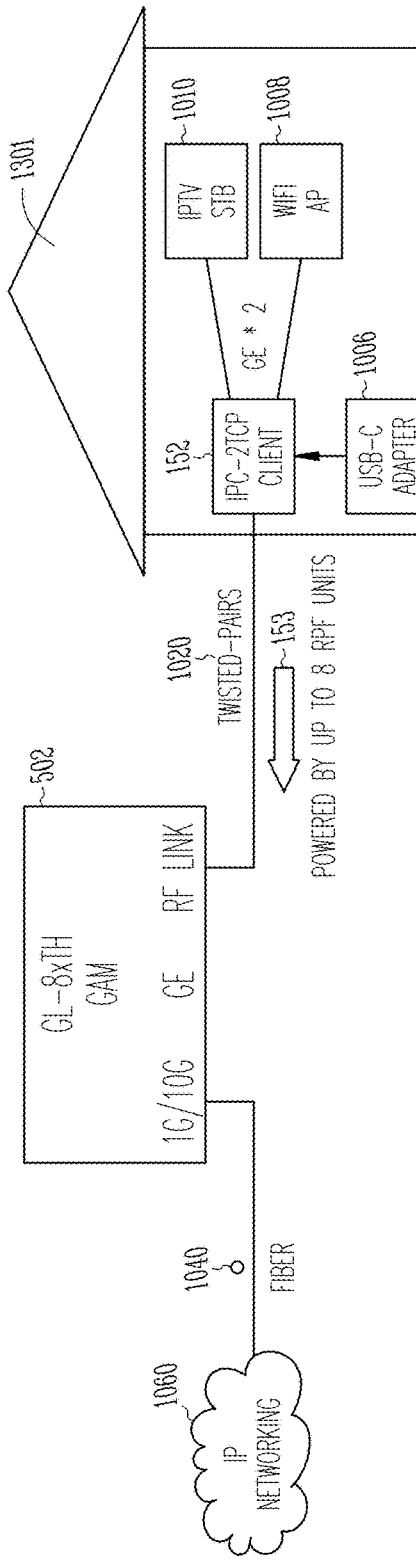

In FIG. 13, a service location 1301 has a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication port 152 using connection 1020 to provide RF modulation communications, in various embodiments. The digital communication port 152 is powered via a USB-C adapter 1006, and is connected to a wireless internet (WiFi) access point 1008 and an internet protocol television set top box 1010 using ethernet connections, in an embodiment. According to various embodiments, the digital communication vault 502 receives power via a reverse power feed (RPF) 153 using the twisted pair connection 1020 from a plurality of the digital communication ports 152, or combination of digital communication ports 152 and digital communication vaults 502. In various embodiments, four ports are used. In various embodiments eight ports are used. Persons of skill in the art, upon reading this disclosure, will appreciate that any number of digital communication ports 152, or a combination of digital communication ports 152 and digital communication vaults 502, may be used without departing from the scope of the present subject matter.

Figure 14:
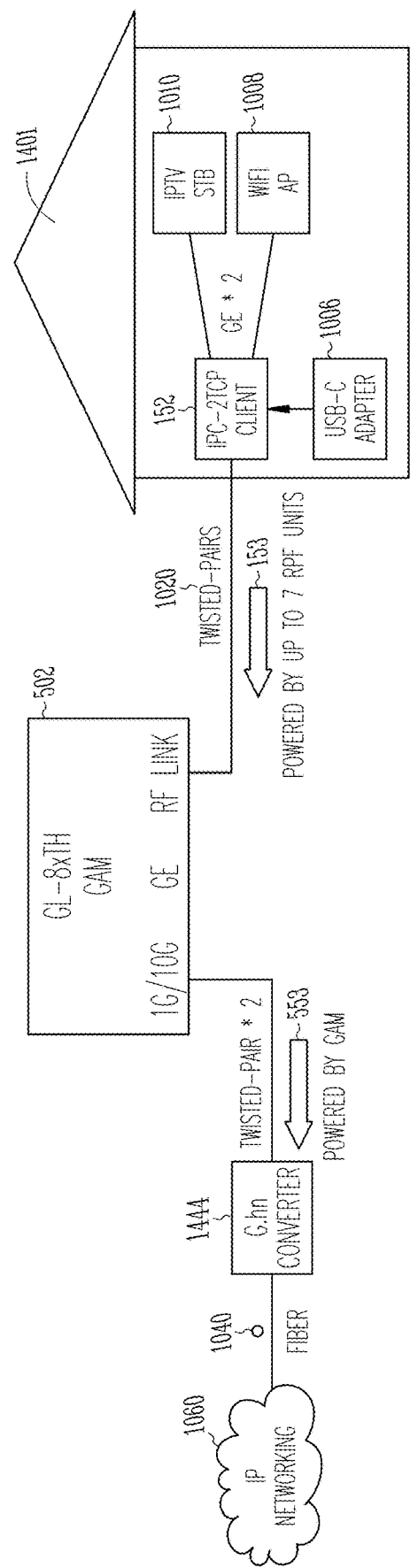

In FIG. 14, a service location 1401 has a digital communication port 152 for internet service. The digital communication port 152 is connected to a digital communication vault 502 that interfaces with a fiber optic cable 1040 via a RF modulation converter 1444 (for example, a G.hn converter) to provide internet via an internet protocol (IP) network 1060. In various embodiments, the digital communication vault 502 provides power using an RPF over connection 553 to the RF modulation converter 1444. The digital communication vault 502 is connected to the digital communication port 152 using connection 1020 to provide RF modulation communications, in various embodiments. The digital communication port 152 is powered via a USB-C adapter 1006, and is connected to a wireless internet (WiFi) access point 1008 and an internet protocol television set top box 1010 using ethernet connections, in an embodiment. According to various embodiments, the digital communication vault 502 receives power via a reverse power feed (RPF) 153 using connection 1020 from one to seven of the digital communication ports 152. Other configurations with different numbers of ports may be employed without departing from the scope of the present subject matter.

Figure 15:
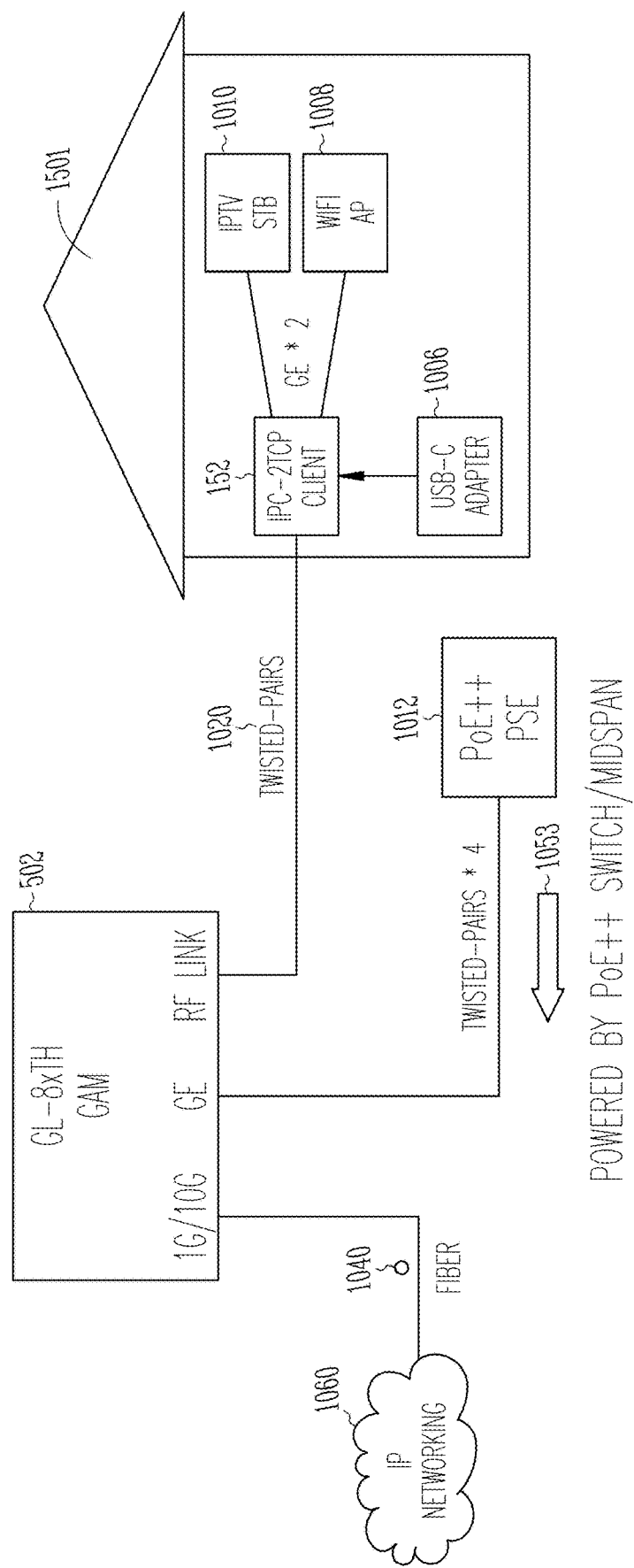

In FIG. 15, a service location 1501 has a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication port 152 using connection 1020 to provide RF modulation communications, in various embodiments. The digital communication port 152 is powered via a USB-C adapter 1006, and is connected to a wireless internet (WiFi) access point 1008 and an internet protocol television set top box 1010 using ethernet connections, in an embodiment. In one embodiment, the digital communication vault 502 receives power via a power over ethernet (PoE) connection 1053 from one or more PoE supplying devices 1012.

Figure 16:
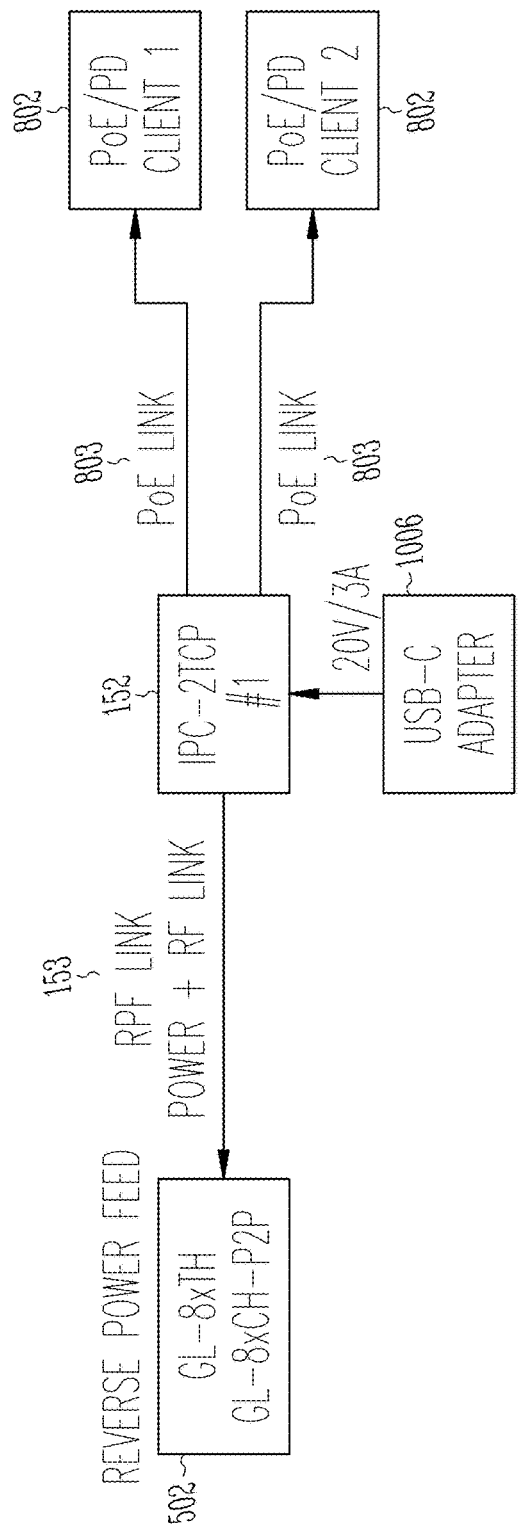
FIG. 16 is a block diagram showing an example of a digital communication vault and a digital communication port employing RF modulation according to one embodiment of the present subject matter.

FIG. 16 is a block diagram showing an example of a digital communication vault 502 and a digital communication port 152 employing the G.hn or G.Fast protocol according to one embodiment of the present subject matter. The digital communication port 152 is connected to a digital communication vault 502 that interfaces with a network to provide internet via an internet protocol (IP) network. The digital communication vault 502 is connected to the digital communication port 152 using a twisted pair connection to provide G.hn or G.Fast protocol communications, in various embodiments. According to various embodiments, the digital communication vault 502 receives power via a reverse power feed (RPF) 153 using the connection from the digital communication port 152. In the depicted embodiment, the digital communication port 152 is powered via a USB-C adapter 1006, and provides power to one or more client devices 802 using one or more power over ethernet (PoE) connections 803.

Figure 17:
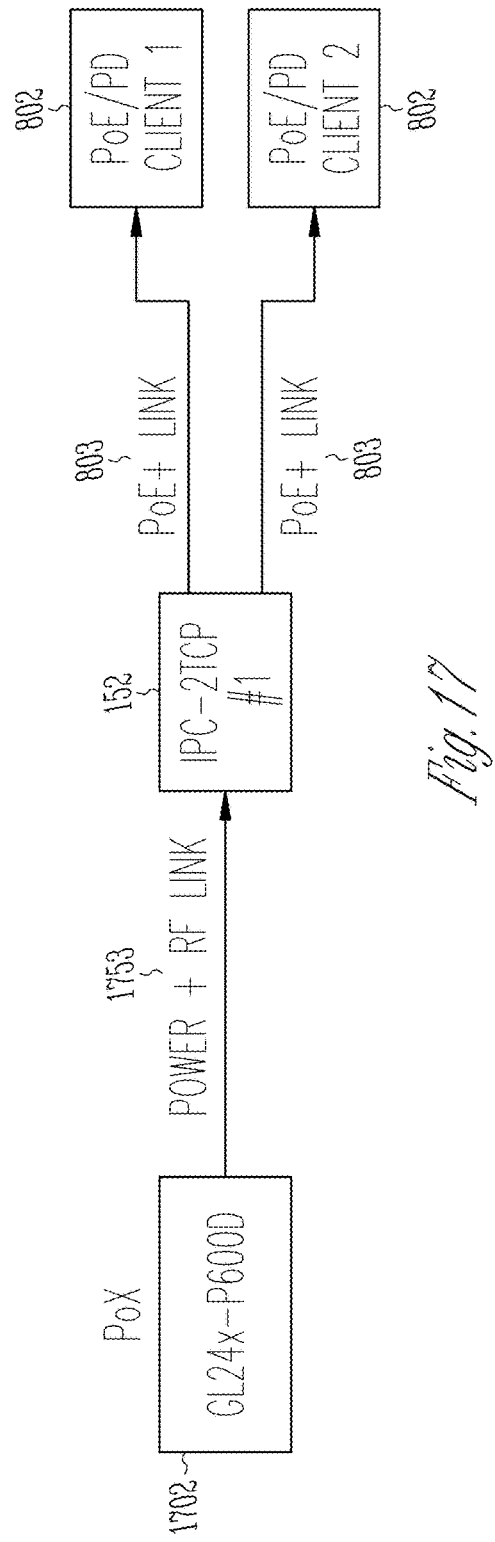
FIG. 17 is a block diagram showing an example of a digital communication multi-port and a digital communication port employing RF modulation according to one embodiment of the present subject matter.

FIG. 17 is a block diagram showing an example of a digital communication multi-port and a digital communication port employing the RF modulation communications according to various embodiments of the present subject matter. The digital communication port 152 is connected to a digital communication multi-port 1702 that interfaces with a network to provide internet via an internet protocol (IP) network. The digital communication multi-port 1702 is connected to the digital communication port 152 using the conductors used to provide RF modulation communications, in various embodiments. According to various embodiments, the digital communication multi-port 1702 provides power via a reverse power feed (RPF) 1753 using a twisted wire connection to the digital communication port 152. According to various embodiments, the digital communication multi-port 1702 provides power via a reverse power feed (RPF) 1753 using coaxial cable connections to the digital communication port 152. In the depicted embodiment, the digital communication port 152 provides power to one or more client devices 802 using one or more power over ethernet (PoE) connections 803.

Figure 18:
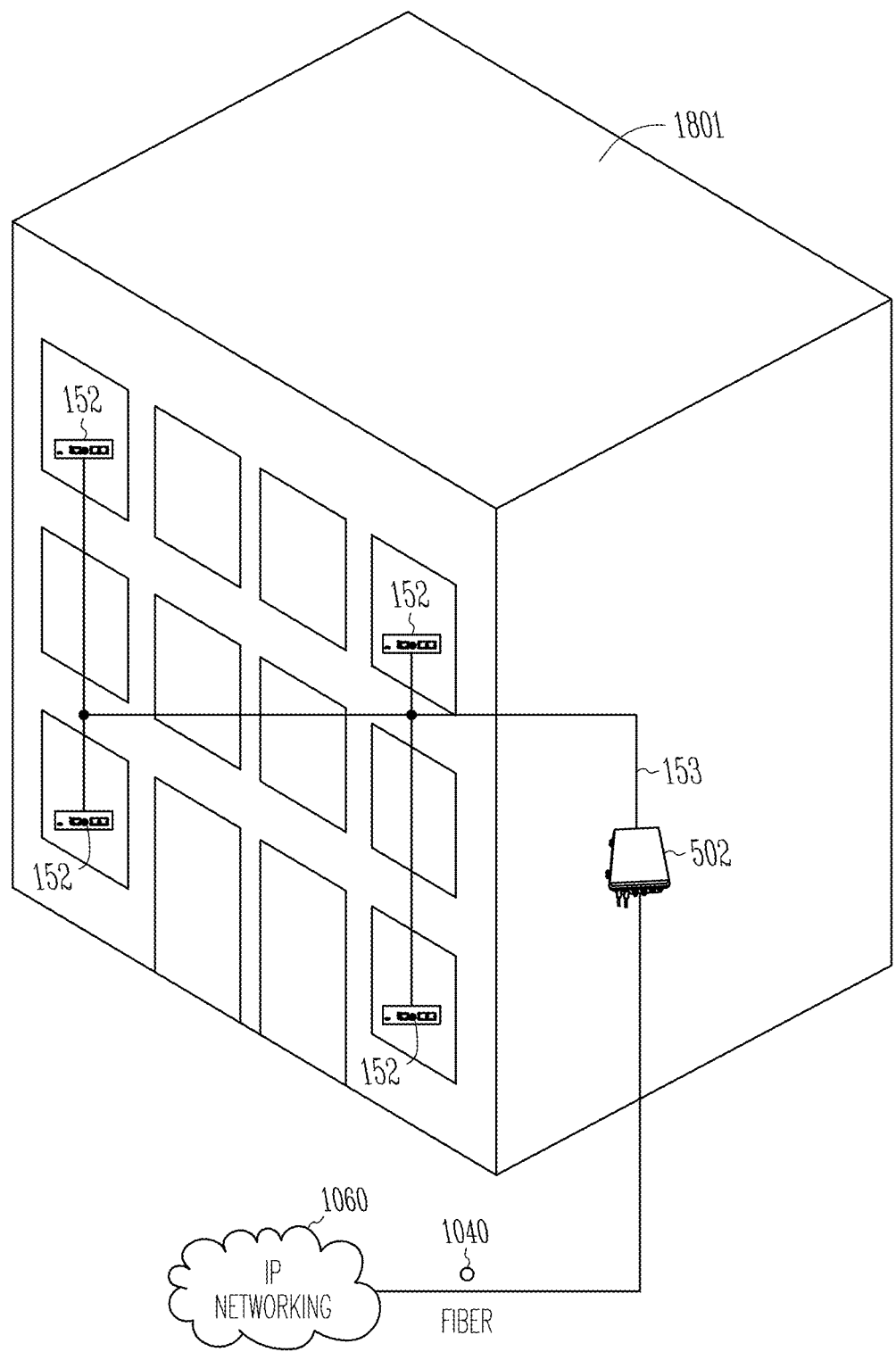
FIG. 18 illustrates a deployment of a digital communication vault and digital communication ports of the present subject matter according to one embodiment of the present subject matter.

FIG. 18 illustrates a deployment of a digital communication vault and digital communication ports of the present subject matter according to one embodiment of the present subject matter. In the depicted embodiment, a service location 1801 has a plurality of digital communication ports 152 for internet service. The digital communication ports 152 are connected to a digital communication vault 502 that interfaces with a fiber optic cable 1040 to provide internet via an internet protocol (IP) network 1060. The digital communication vault 502 is connected to the digital communication ports 152 using conductors to provide RF modulation communications, in various embodiments. According to various embodiments, the digital communication vault 502 receives power via a reverse power feed (RPF) 153 using the twisted wire connection from one or more of the digital communication ports 152. In various embodiments, the digital communication vault 502 receives power via a reverse power feed (RPF) 153 using coaxial cable connections from one or more of the digital communication ports 152.

Figure 19:
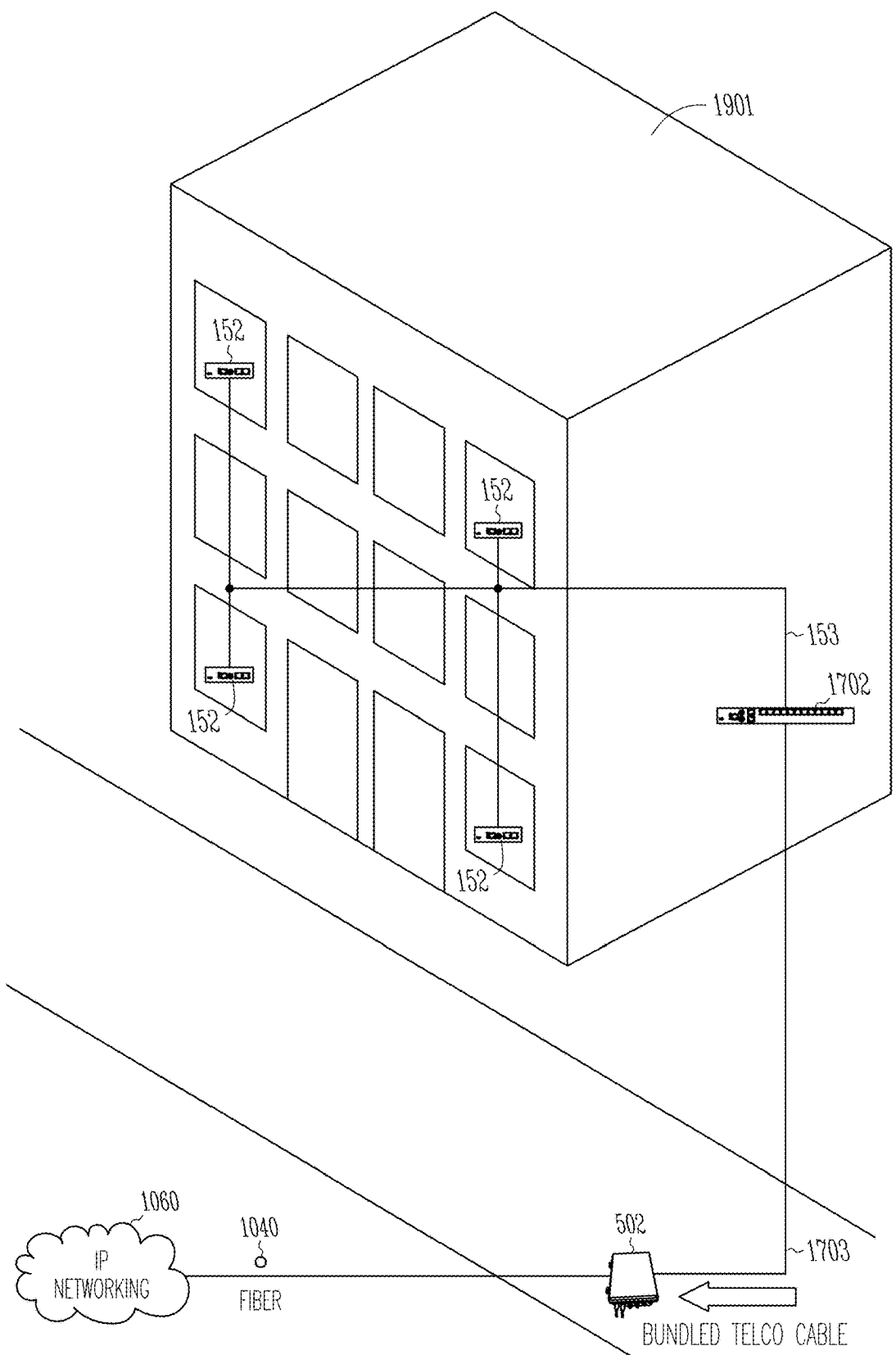
FIG. 19 illustrates a deployment of a digital communication vault, a digital communication multi-port and digital communication ports of the present subject matter according to one embodiment of the present subject matter.

FIG. 19 illustrates a deployment of a digital communication vault, a digital communication multi-port and digital communication ports of the present subject matter according to one embodiment of the present subject matter. In the depicted embodiment, a service location 1901 has a plurality of digital communication ports 152 for internet service. The digital communication ports 152 are connected to a digital communication multi-port 1702. The digital communication multi-port 1702 is connected to a digital communication vault 502 that interfaces with a fiber optic cable 1040 to provide internet via an internet protocol (IP) network 1060. The digital communication vault 502 is connected to the digital communication multi-port 1702 using conductors to provide RF modulation communications, in various embodiments. According to various embodiments, the digital communication vault 502 receives power via a reverse power feed (RPF) 1703 using the twisted wire connection from the digital communication multi-port 1702. According to various embodiments, the digital communication vault 502 receives power via a reverse power feed (RPF) 1703 using coaxial cable connections from the digital communication multi-port 1702.

Figure 20:
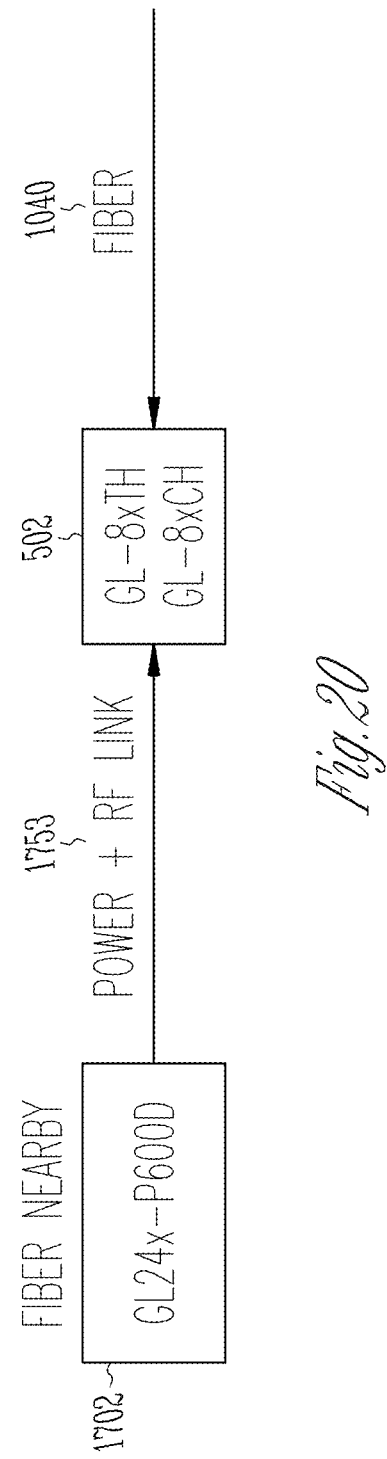
FIG. 20 is a block diagram showing an example of a digital communication multi-port and a digital communication vault employing RF modulation according to one embodiment of the present subject matter.

FIG. 20 is a block diagram showing an example of a digital communication multi-port and a digital communication vault employing the RF modulation communications over conductors, according to various embodiments of the present subject matter. In the depicted embodiment, a digital communication multi-port 1702 is connected to a digital communication vault 502 that interfaces with a fiber optic cable 1040 to provide internet via an internet protocol (IP) network. The digital communication vault 502 is connected to the digital communication multi-port 1702 using a twisted wire connection to provide RF modulation communications, in various embodiments. In various embodiments, the digital communication vault 502 is connected to the digital communication multi-port 1702 using coaxial cable connections to provide RF modulation communications, in various embodiments. In various embodiments, the digital communication vault 502 receives power via a reverse power feed (RPF) 1703 using the connection from the digital communication multi-port 1702.

Figure 21:
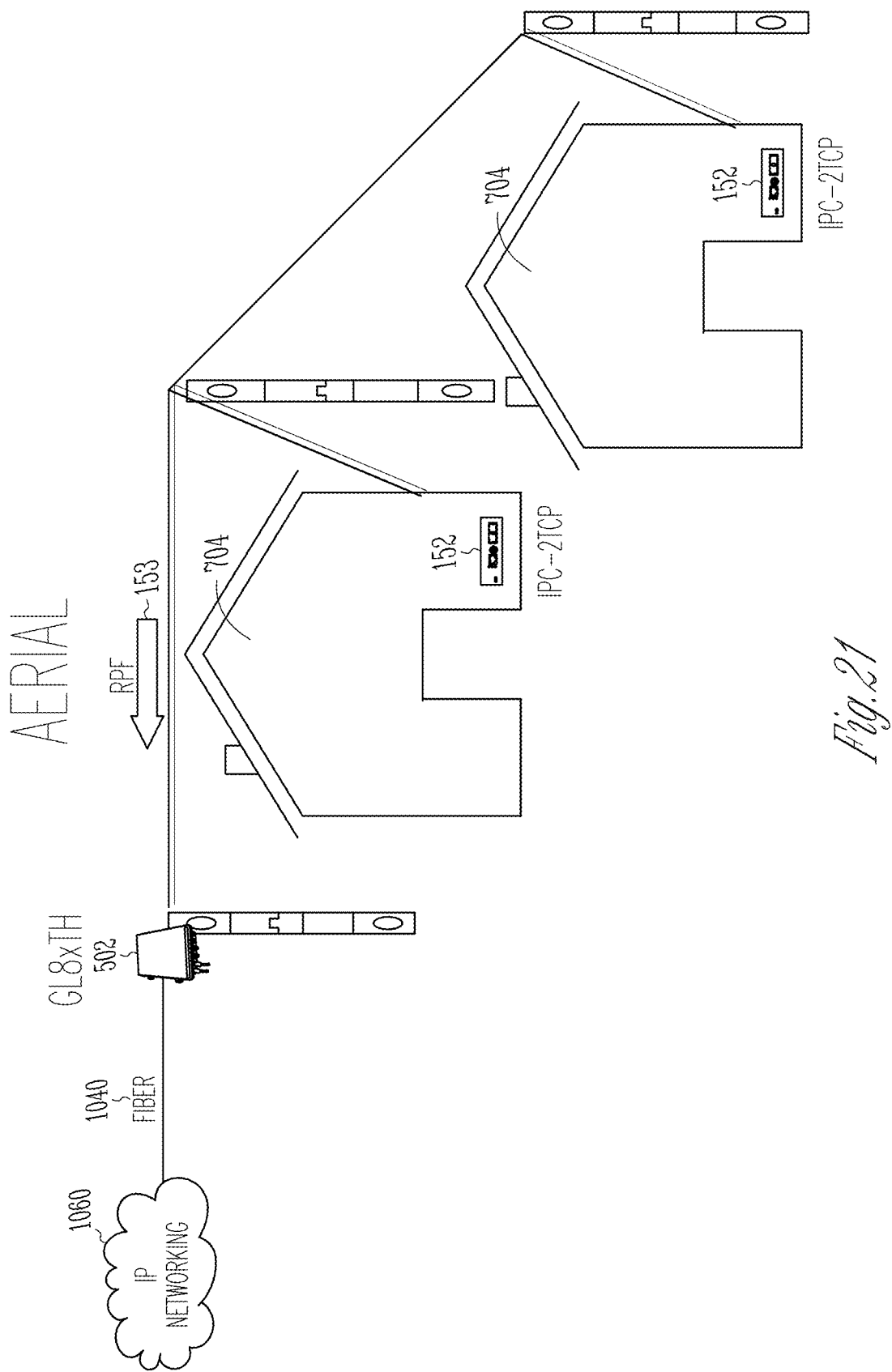
FIGS. 21-22 illustrate various deployments of digital communication vaults and digital communication ports of the present subject matter according to various embodiments of the present subject matter.
Figure 22:
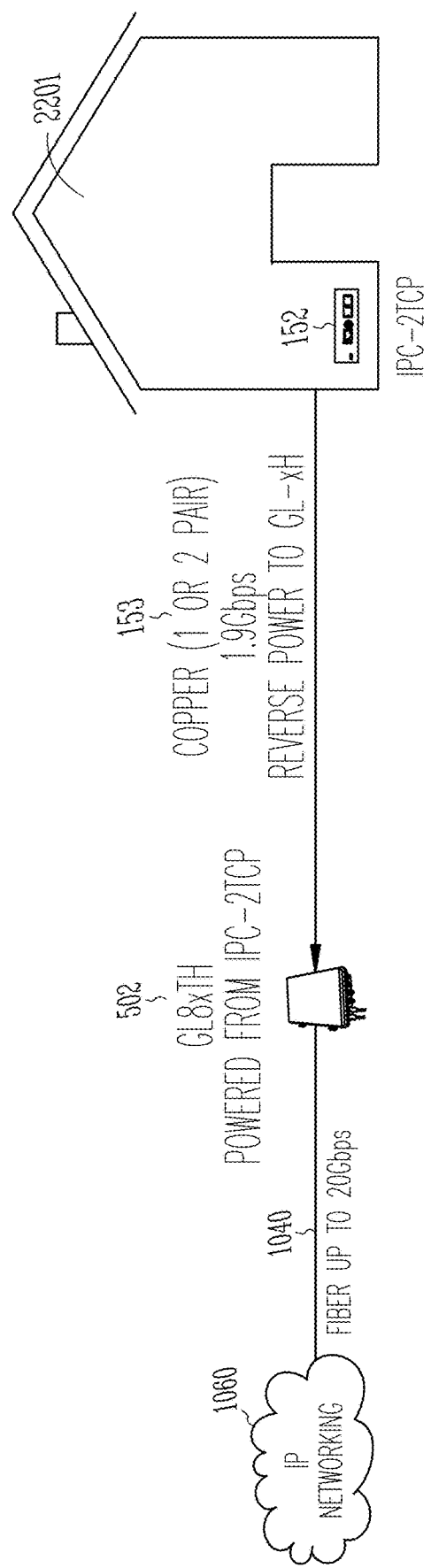

FIGS. 21-22 illustrate various deployments of digital communication vaults and digital communication ports of the present subject matter according to various embodiments of the present subject matter. In FIG. 21, a plurality of service locations 2101, 2102 have a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication ports 152 using an aerial twisted wire connection to provide RF modulation communications, in various embodiments. In various embodiments, the digital communication vault 502 is connected to the digital communication ports 152 using coaxial cable connections to provide RF modulation standard communications. According to various embodiments, the digital communication vault 502 receives power via a reverse power feed (RPF) 153 using the connection from the digital communication ports 152.

In FIG. 22, a service location 2201 has a digital communication port 152 for internet service. The digital communication port 152 is connected to a digital communication vault 502 that interfaces with a fiber optic cable 1040 to provide internet via an internet protocol (IP) network 1060. The digital communication vault 502 is connected to the digital communication ports 152 using a twisted wire connection to provide G.hn or G.Fast protocol communications, in various embodiments. In various embodiments, the digital communication vault 502 is connected to the digital communication ports 152 using coaxial cable connections to provide RF modulation communications. According to various embodiments, the digital communication vault 502 receives power via a reverse power feed (RPF) 153 using the connection from the digital communication port 152.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-22 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Example Machine Architecture and Machine-Readable Medium

Figure 23:
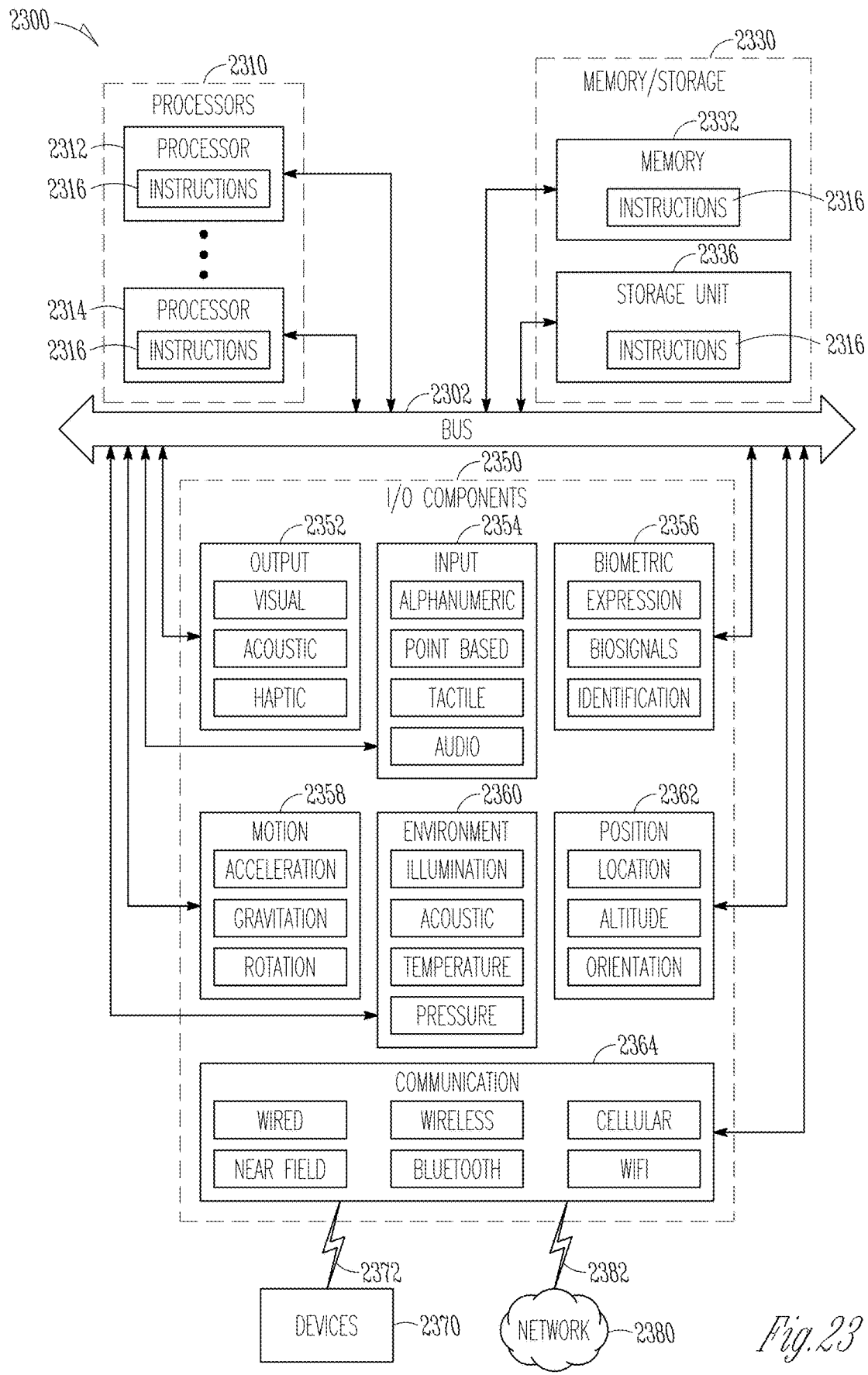
FIG. 23 is a block diagram illustrating components of a machine, according to some example embodiments, able to read instructions from a machine-readable medium (e.g., a machine-readable storage medium) and perform any one or more of the methodologies discussed herein.

FIG. 23 is a block diagram illustrating components of a machine 2300, according to some example embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein may be executed. For example the instructions may cause the machine to execute the flow diagrams of FIGS. 8-11. Additionally, or alternatively, the instructions may implement one or more of the devices and/or components of FIGS. 1-7 and 12. The instructions transform the general, non-programmed machine into a particular machine programmed to carry out the described and illustrated functions in the manner described. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a personal digital assistant (PDA), or any machine capable of executing the instructions 2316, sequentially or otherwise, that specify actions to be taken by machine 2300. Further, while only a single machine 2300 is illustrated, the term "machine" shall also be taken to include a collection of machines 2300 that individually or jointly execute the instructions 2316 to perform any one or more of the methodologies discussed herein.

The machine 2300 may include processors 2310, memory 2330, and I/O components 2350, which may be configured to communicate with each other such as via a bus 2302. In an example embodiment, the processors 2310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2312 and processor 2314 that may execute instructions 2316. The term "processor" is intended to include multi-core processor that may comprise two or more independent processors (sometimes referred to as "cores") that may execute instructions contemporaneously. Although FIG. 23 shows multiple processors, the machine 2300 may include a single processor with a single core, a single processor with multiple cores (e.g., a multi-core process), multiple processors with a single core, multiple processors with multiples cores, or any combination thereof.

The memory/storage 2330 may include a memory 2332, such as a main memory, or other memory storage, and a storage unit 2336, both accessible to the processors 2310 such as via the bus 2302. The storage unit 2336 and memory 2332 store the instructions 2316 embodying any one or more of the methodologies or functions described herein. The instructions 2316 may also reside, completely or partially, within the memory 2332, within the storage unit 2336, within at least one of the processors 2310 (e.g., within the processor's cache memory), or any suitable combination thereof, during execution thereof by the machine 2300. Accordingly, the memory 2332, the storage unit 2336, and the memory of processors 2310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions (e.g., instructions 2316) for execution by a machine (e.g., machine 2300), such that the instructions, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2350 may include a wide variety of components to receive input, provide output, produce output, transmit information, exchange information, capture measurements, and so on. The specific I/O components 2350 that are included in a particular machine will depend on the type of machine. For example, portable machines such as mobile phones will likely include a touch input device or other such input mechanisms, while a headless server machine will likely not include such a touch input device. It will be appreciated that the I/O components 2350 may include many other components that are not shown in FIG. 23. The I/O components 2350 are grouped according to functionality merely for simplifying the following discussion and the grouping is in no way limiting. In various example embodiments, the I/O components 2350 may include output components 2352 and input components 2354. The output components 2352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2350 may include biometric components 2356, motion components 2358, environmental components 2360, or position components 2362 among a wide array of other components. For example, the biometric components 2356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 may include acceleration sensor components (e.g., accelerometer), gravitation sensor components, rotation sensor components (e.g., gyroscope), and so forth. The environmental components 2360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2364 operable to couple the machine 2300 to a network 2380 or devices 2370 via coupling 2382 and coupling 2372 respectively. For example, the communication components 2364 may include a network interface component or other suitable device to interface with the network 2380. In further examples, communication components 2364 may include wired communication components, wireless communication components, cellular communication components, Near Field Communication ((NFC) components, Bluetooth® components (e.g., Bluetooth® Low Energy), Wi-Fi® components, and other communication components to provide communication via other modalities. The devices 2370 may be another machine or any of a wide variety of peripheral devices (e.g., a peripheral device coupled via a Universal Serial Bus (USB)).

Moreover, the communication components 2364 may detect identifiers or include components operable to detect identifiers. For example, the communication components 2364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF413, Ultra. Code, UCC RSS-2D bar code, and other optical codes), or acoustic detection components (e.g., microphones to identify tagged audio signals). In addition, a variety of information may be derived via the communication components 2364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2380 may be an ad hoc network, an intranet, an extranet, a virtual private network (TN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fie network, another type of network, or a combination of two or more such networks. For example, the network 2380 or a portion of the network 2380 may include a wireless or cellular network and the coupling 2382 may be a Code Division Multiple Access (CDMA) connection, a Global System for Mobile communications (GSM) connection, or other type of cellular or wireless coupling. In this example, the coupling 2382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2316 may be transmitted or received over the network 2380 using a transmission medium via a network interface device (e.g., a network interface component included in the communication components 2364) and utilizing any one of a number of well-known transfer protocols (e.g., hypertext transfer protocol (HTTP)). Similarly, the instructions 2316 may be transmitted or received using a transmission medium via the coupling 2372 (e.g., a peer-to-peer coupling) to devices 2370. The term "transmission medium" shall be taken to include any intangible medium that is capable of storing, encoding, or carrying instructions 2316 for execution by the machine 2300, and includes digital or analog communications signals or other intangible medium to facilitate communication of such software.

EXAMPLES

Example 1 is a digital communication port for communications with an external digital device over multiple conductors, the digital communications port comprising: communication electronics for communicating radio frequency (RF) modulation communications over the multiple conductors; and bidirectional power feed electronics that are programmable to be configured to at least: receive power from an external device using at least two of the multiple conductors so as to power the bidirectional power feed electronics and to power the communication electronics; or provide power to the external device using at least two of the multiple conductors so as to power the external device.

In Example 2, the subject matter of Example 1 includes, wherein the multiple conductors include twisted wires.

In Example 3, the subject matter of Example 1 includes, wherein the multiple conductors include coaxial cable.

In Example 4, the subject matter of Examples 1-3 includes, wherein the bidirectional power feed electronics are programmable to be configured to provide power in one or more of a reverse power path, a forward power path, or a bidirectional power path configurations.

In Example 5, the subject matter of Examples 1-4 includes, wherein the bidirectional power feed electronics are programmable to be configured to provide a power relay configuration.

In Example 6, the subject matter of Examples 1-5 includes, wherein the bidirectional power feed electronics are programmable to be configured to receive power from multiple external devices.

In Example 7, the subject matter of Examples 1-6 includes, wherein the bidirectional power feed electronics are programmable to be configured to provide power to multiple external devices.

In Example 8, the subject matter of Examples 1-7 includes, wherein the bidirectional power feed electronics are programmable to be configured to provide power to the external device connected in series.

In Example 9, the subject matter of Examples 1-7 includes, wherein the bidirectional power feed electronics are programmable to be configured to provide power to the external device connected in parallel.

In Example 10, the subject matter of Examples 1-9 includes, wherein the radio frequency (RF) modulation communications include one or more of discrete multi-tone (DMT) modulation, orthogonal frequency division multiplexing (OFDM), coded orthogonal frequency-division multiplexing (CODFDM), ultra-wideband (UWB), pulse-position modulation, or orthogonal frequency-division multiple access (OFDMA).

Example 11 is a system comprising: a first digital communication port; and a second digital communication port connected to the first digital communication port using radio frequency (RF) modulation communications over multiple conductors, wherein the first digital communication port includes: first communication electronics for communicating with at least one first digital communications connector over the multiple conductors; and a first bidirectional power feed connection that is programmable to be configured to at least: receive power from the second digital communication port using at least two of the multiple conductors so as to power the first bidirectional power feed connection and to power the first communication electronics; or provide power to the second digital communication port using at least two of the multiple conductors so as to power the second digital communications port, wherein the second digital communication port includes: second communication electronics for communicating with at least one second digital communications connector over the multiple conductors; and a second bidirectional power feed connection that is programmable to be configured to at least: receive power from the first digital communications port using at least two of the multiple conductors so as to power the second bidirectional power feed connection and to power the second communication electronics; or provide power to the first digital communication port using at least two of the multiple conductors so as to power the first digital communications port.

In Example 12, the subject matter of Example 11 further includes, a third digital communications port connected to at least one of the first digital communication port or the second digital communications port, wherein the third communications port includes: third communication electronics for communicating with at least one third digital communications connector; and a third bidirectional power feed connection that is programmable to be configured to at least: receive power from the at least one of the first digital communication port or the second digital communication port using at least two of the multiple conductors so as to power the third bidirectional power feed connection and to power the third communication electronics; or provide power to the at least one of the first digital communication port or the second digital communications port using at least two conductors of the multiple conductors so as to power the at least one of the first digital communication port or the second digital communications port.

In Example 13, the subject matter of Examples 11-12 includes, wherein the radio frequency (RF) modulation communications include radio frequency (RF) modulation communications, including one or more of discrete multi-tone (DMT) modulation, orthogonal frequency division multiplexing (OFDM), coded orthogonal frequency-division multiplexing (CODFDM), ultra-wideband (UWB), pulse-position modulation, or orthogonal frequency-division multiple access (OFDMA).

In Example 14, the subject matter of Examples 11-13 includes, wherein the multiple conductors include twisted wire.

In Example 15, the subject matter of Examples 11-13 includes, wherein the multiple conductors include coaxial cable.

In Example 16, the subject matter of Examples 12-15 includes, wherein the first digital communications port, the second digital communication port, and the third digital communications port are connected in series.

In Example 17, the subject matter of Examples 12-15 includes, wherein the first digital communications port, the second digital communication port, and the third digital communications port are connected in parallel.

In Example 18, the subject matter of Examples 11-17 includes, wherein at least one of the first bidirectional power feed connection or the second bidirectional power feed connection is programmable to be configured to provide power via a reverse power path.

In Example 19, the subject matter of Examples 11-17 includes, wherein at least one of the first bidirectional power feed connection or the second bidirectional power feed connection is programmable to be configured to provide power via a forward power path.

In Example 20, the subject matter of Examples 11-17 includes, wherein at least one of the first bidirectional power feed connection or the second bidirectional power feed connection is programmable to be configured to provide power via a bidirectional power path.

Example 21 is a method for providing a digital communication port for communications with an external digital device over multiple conductors, the method comprising: providing communication electronics for communicating radio frequency (RF) modulation communications over the multiple conductors; and programming bidirectional power feed electronics to be configured to at least: receive power from an external device using at least two of the multiple conductors so as to power the bidirectional power feed electronics and to power the communication electronics; or provide power to the external device using at least two of the multiple conductors so as to power the external device.

In Example 22, the subject matter of Example 21 includes, wherein the multiple conductors include twisted wires.

In Example 23, the subject matter of Example 21 includes, wherein the multiple conductors include coaxial cable.

In Example 24, the subject matter of Examples 21-23 further includes programming the bidirectional power feed electronics to be configured to provide power in one or more of a reverse power path, a forward power path, or a bidirectional power path configurations.

In Example 25, the subject matter of Examples 21-24 further includes programming the bidirectional power feed electronics to be configured to provide a power relay configuration.

In Example 26, the subject matter of Examples 21-25 further includes programming the bidirectional power feed electronics to be configured to receive power from multiple external devices.

In Example 27, the subject matter of Examples 21-26 further includes programming the bidirectional power feed electronics to be configured to provide power to multiple external devices.

In Example 28, the subject matter of Examples 21-27 further includes programming the bidirectional power feed electronics to be configured to provide power to the external device connected in series.

In Example 29, the subject matter of Examples 21-27 further includes programming the bidirectional power feed electronics to be configured to provide power to the external device connected in parallel.

In Example 30, the subject matter of Examples 21-29 includes, wherein the radio frequency (RF) modulation communications include one or more of discrete multi-tone (DMT) modulation, orthogonal frequency division multiplexing (OFDM), coded orthogonal frequency-division multiplexing (CODFDM), ultra-wideband (UWB), pulse-position modulation, or orthogonal frequency-division multiple access (OFDMA).

Example 31 is a digital communication port, comprising: communication electronics for communicating with at least one digital communications connector; and a bidirectional power feed connection configured to receive power from or provide power to an external device via a twisted pair connection configured for G.hn digital communications between the digital communication port and the external device.

In Example 32, the subject matter of Example 31 includes, wherein the bidirectional power feed connection provides a reverse power path.

In Example 33, the subject matter of Example 31 includes, wherein the bidirectional power feed connection provides a forward power path.

In Example 34, the subject matter of Example 31 includes, wherein the bidirectional power feed connection provides a bidirectional power path.

In Example 35, the subject matter of Examples 31-34 includes, wherein the bidirectional power feed connection provides a power relay function.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 a system to implement of any of Examples 1-35, Example 39 is a method to implement of any of Examples 1-35.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. The scope of the invention should be determined with reference to the appended claims, along with the full scope of equivalents to which such claims are entitled.

The invention claimed is:

1. A method for a digital communication system, comprising:
providing a plurality of digital communication ports that can be deployed at a location, each of the plurality of digital communication ports comprising:
an RF transceiver configured for conducting orthogonal frequency division multiplexing (OFDM) radio frequency (RF) modulation communications over at least a first cable having two to seven conductors;
power feed electronics connected to provide power to a digital device using at least two conductors of the first cable; and
communication electronics for communicating over a second cable including at least eight conductors; and
providing power to the digital device connected to the first cable simultaneously from two or more digital communication ports of the plurality of digital communication ports.

2. The method of claim 1, further comprising communicating with at least one communication port of the plurality of communication ports using G.hn standard communications.

3. The method of claim 1, further comprising communicating with at least one communication port of the plurality of communication ports using G.fast standard communications.

4. The method of claim 1, herein the first cable has four conductors and further comprising communicating with at least one communication port of the plurality of communication ports using G.hn standard communications.

5. The method of claim 1, wherein the first cable has four conductors and further comprising communicating with at least one communication port of the plurality of communication ports using G.fast standard communications.

6. The method of claim 1, wherein the first cable has four twisted wire conductors and further comprising communicating with at least one communication port of the plurality of communication ports using G.hn standard communications.

7. The method of claim 1, wherein the first cable has four twisted wire conductors and further comprising communicating with at least one communication port of the plurality of communication ports using G.fast standard communications.

8. The method of claim 1, wherein the first cable includes coaxial cable and further comprising communicating with at least one communication port of the plurality of communication ports using G.hn standard communications.

9. The method of claim 1, wherein the first cable includes coaxial cable and further comprising communicating with at least one communication port of the plurality of communication ports using G.fast standard communications.

10. The method of claim 1, further comprising communicating from at least one of the plurality of digital communication ports to another device using the second cable.

11. A method for a digital communication system, comprising:
using a digital device at a location, communicating with a plurality of digital communication ports about the location, each of the plurality of digital communication ports comprising:
an RF transceiver configured for conducting orthogonal frequency division multiplexing (OFDM) radio frequency (RF) modulation communications over at least a first cable having two to seven conductors;
power feed electronics connected to provide power to the digital device using at least two conductors of the first cable; and
communication electronics for communicating over a second cable including at least eight conductors;
remotely configuring two or more digital communication ports of the plurality of digital communication ports; and
if the digital device requires power, simultaneously providing power to the digital device over the at least two conductors of the first cable using at least two digital communication ports of the plurality of digital communication ports.

12. The method of claim 11, further comprising communicating with at least one communication port of the plurality of communication ports using G.hn standard communications.

13. The method of claim 11, further comprising communicating with at least one communication port of the plurality of communication ports using G.fast standard communications.

14. The method of claim 11, wherein the first cable has four conductors and further comprising communicating with at least one communication port of the plurality of communication ports using G.hn standard communications.

15. The method of claim 11, wherein the first cable has four conductors and further comprising communicating with at least one communication port of the plurality of communication ports using G.fast standard communications.

16. The method of claim 11, wherein the first cable has four twisted wire conductors and further comprising communicating with at least one communication port of the plurality of communication ports using G.hn standard communications.

17. The method of claim 11, wherein the first cable has four twisted wire conductors and further comprising communicating with at least one communication port of the plurality of communication ports using G.fast standard communications.

18. The method of claim 11, wherein the first cable includes coaxial cable and further comprising communicating with at least one communication port of the plurality of communication ports using G.hn standard communications.

19. The method of claim 11, wherein the first cable includes coaxial cable and further comprising communicating with at least one communication port of the plurality of communication ports using G.fast standard communications.

20. The method of claim 11, further comprising communicating from at least one of the plurality of digital communication ports to another device using the second cable.

21. A method for a digital communication system, comprising:
   using a digital device at a location, communicating with a plurality of digital communication ports about the location, each of the plurality of digital communication ports comprising:
      an RF transceiver configured for conducting orthogonal frequency division multiplexing (OFDM) radio frequency (RF) modulation communications over at least a first cable having two to seven conductors;
      power feed electronics connected to provide power to the digital device using at least two conductors of the first cable; and
      communication electronics for communicating over a second cable including at least eight conductors; and
   if the digital device requires power, simultaneously providing power to the digital device over the at least two conductors of the first cable using at least two digital communication ports of the plurality of digital communication ports.

22. The method of claim 21, wherein the first cable has four conductors and further comprising communicating with at least one communication port of the plurality of communication ports using G.hn standard communications.

23. The method of claim 21, wherein the first cable has four conductors and further comprising communicating with at least one communication port of the plurality of communication ports using G.fast standard communications.

24. The method of claim 21, wherein the first cable includes coaxial cable and further comprising communicating with at least one communication port of the plurality of communication ports using G.hn standard communications.

25. The method of claim 21, wherein the first cable includes coaxial cable and further comprising communicating with at least one communication port of the plurality of communication ports using G.fast standard communications.

26. The method of claim 21, wherein the first cable has four conductors, each communications port includes a power over Ethernet (POE) circuit for powering a device connected to the second cable, and further comprising communicating with at least one communication port of the plurality of communication ports using G.hn standard communications.

27. The method of claim 21, wherein the first cable has four conductors, each communications port includes a power over Ethernet (POE) circuit for powering a device connected to the second cable, and further comprising communicating with at least one communication port of the plurality of communication ports using G.fast standard communications.

28. The method of claim 21, wherein the first cable includes coaxial cable, each communications port includes a power over Ethernet (POE) circuit for powering a device connected to the second cable, and further comprising communicating with at least one communication port of the plurality of communication ports using G.hn standard communications.

29. The method of claim 21, wherein the first cable includes coaxial cable, each communications port includes a power over Ethernet (POE) circuit for powering a device connected to the second cable, and further comprising communicating with at least one communication port of the plurality of communication ports using G.fast standard communications.

* * * * *